(12) United States Patent
Kawasaki et al.

(10) Patent No.: US 7,110,180 B2
(45) Date of Patent: Sep. 19, 2006

(54) DIFFRACTION GRATING, METHOD OF FABRICATING DIFFRACTION OPTICAL ELEMENT, OPTICAL PICKUP DEVICE, AND OPTICAL DISK DRIVE

(75) Inventors: Toshiyuki Kawasaki, Kanagawa (JP); Shigeru Oohchida, Tokyo (JP); Tsuyoshi Suzudo, Miyagi (JP); Koji Mori, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 139 days.

(21) Appl. No.: 10/679,479

(22) Filed: Oct. 7, 2003

(65) Prior Publication Data

US 2004/0125454 A1  Jul. 1, 2004

(30) Foreign Application Priority Data

Oct. 9, 2002  (JP) .............................. 2002-295642
Dec. 27, 2002  (JP) .............................. 2002-380750

(51) Int. Cl.
*G02B 5/18*  (2006.01)

(52) U.S. Cl. ..................... 359/569; 359/566; 359/573; 359/575; 369/112.07

(58) Field of Classification Search ........ 359/558–576; 369/112.06–112.09
See application file for complete search history.

(56) References Cited

U.S. PATENT DOCUMENTS

| 5,015,835 A | 5/1991 | Ohuchida et al. |
| 5,101,389 A | 3/1992 | Ohuchida et al. |
| 5,107,359 A | 4/1992 | Ohuchida |
| 5,115,423 A | 5/1992 | Maeda et al. |
| 5,231,620 A | 7/1993 | Ohuchida |
| 5,243,583 A | 9/1993 | Ohuchida et al. |
| 5,245,471 A * | 9/1993 | Iwatsuka et al. ............ 359/494 |
| 5,278,817 A | 1/1994 | Maeda et al. |
| 5,325,348 A | 6/1994 | Maeda et al. |
| 5,428,472 A * | 6/1995 | Miyake et al. .............. 359/197 |
| 5,428,588 A | 6/1995 | Ohuchida |
| 5,684,779 A | 11/1997 | Ohuchida et al. |
| 5,742,433 A * | 4/1998 | Shiono et al. .............. 359/575 |
| 5,956,302 A | 9/1999 | Maeda et al. |
| 6,026,101 A | 2/2000 | Suzudo et al. |
| 6,111,900 A | 8/2000 | Suzudo |
| 6,584,060 B1 | 6/2003 | Oohchida et al. |
| 6,898,169 B1 * | 5/2005 | Kadowaki et al. ..... 369/112.12 |
| 2001/0026523 A1 | 10/2001 | Ohuchida et al. |
| 2002/0018432 A1 | 2/2002 | Ohuchida |
| 2002/0018433 A1 | 2/2002 | Ohuchida |
| 2002/0093902 A1 | 7/2002 | Hirai et al. |

(Continued)

FOREIGN PATENT DOCUMENTS

JP  07-084110  3/1995

(Continued)

OTHER PUBLICATIONS

Kanetake, et al; "Quasi-Epitaxial Growth of Diacetylene Films by Vacuum Deposition", J. Appl. Phys., vol. 72 (3) (Aug. 1, 1992).

*Primary Examiner*—Leonidas Boutsikaris
(74) *Attorney, Agent, or Firm*—Dickstein Shapiro LLP

(57) ABSTRACT

A diffraction grating with periodically arranged protrusions and grooves at a relatively narrow pitch and improved diffraction efficiency is disclosed. The protrusions of the grating are made of a material whose index of refraction is greater than that of the grooves, and the ratio of the width D of the protrusion to the pitch $\Lambda$ of the protrusion is set equal to or less than 0.4 ($D/\Lambda \leq 0.4$).

10 Claims, 26 Drawing Sheets

U.S. PATENT DOCUMENTS

2002/0163723 A1    11/2002    Suzudo
2003/0072047 A1     4/2003    Funato et al.

FOREIGN PATENT DOCUMENTS

| JP | 07-092312 | 4/1995 |
| JP | 08-334609 | 12/1996 |
| JP | 9-50642 | 2/1997 |
| JP | 11-265515 | 9/1999 |
| JP | 2000-75130 | 3/2000 |
| JP | 2001-281432 | 10/2001 |
| JP | 2002-214420 | 7/2002 |
| JP | 2002-288856 | 10/2002 |

* cited by examiner

FIG.17A
FIG.17B
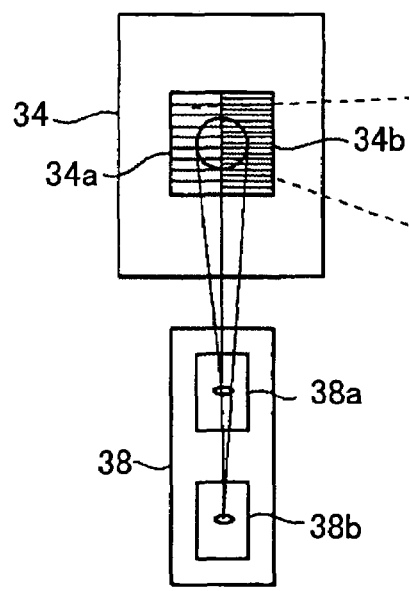
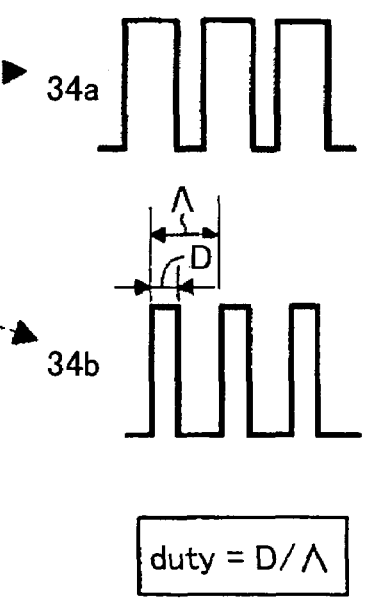
duty = D/Λ

FIG.24
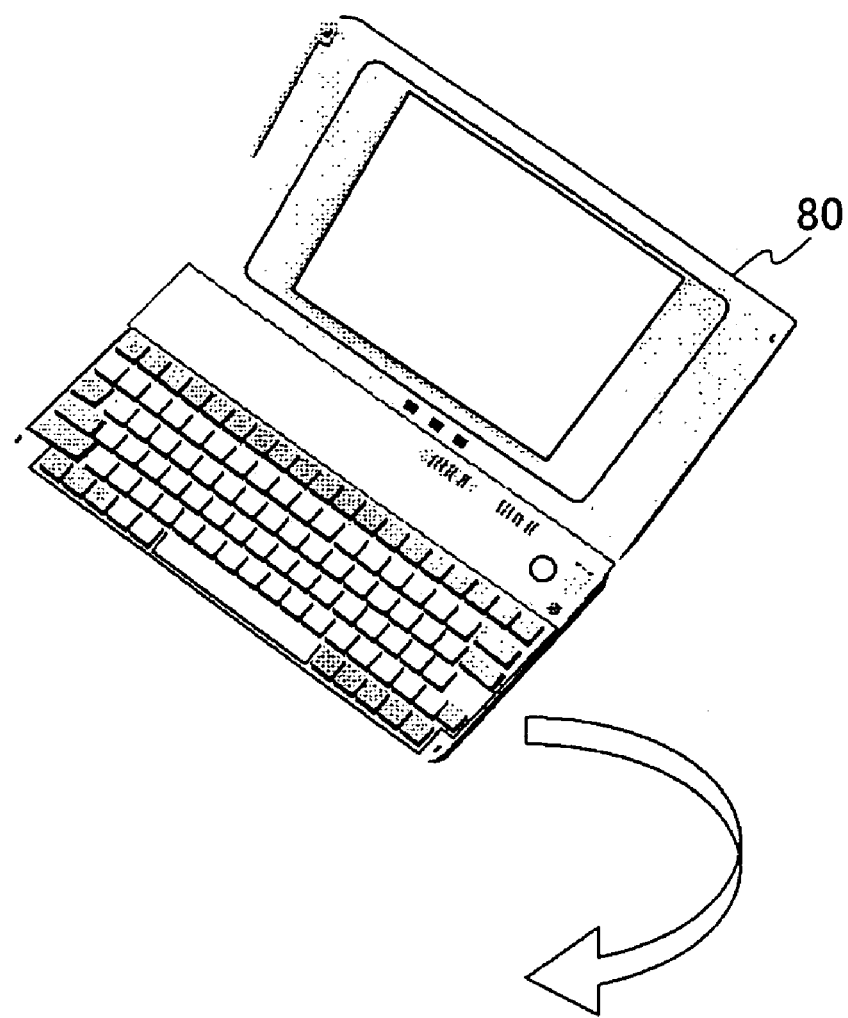
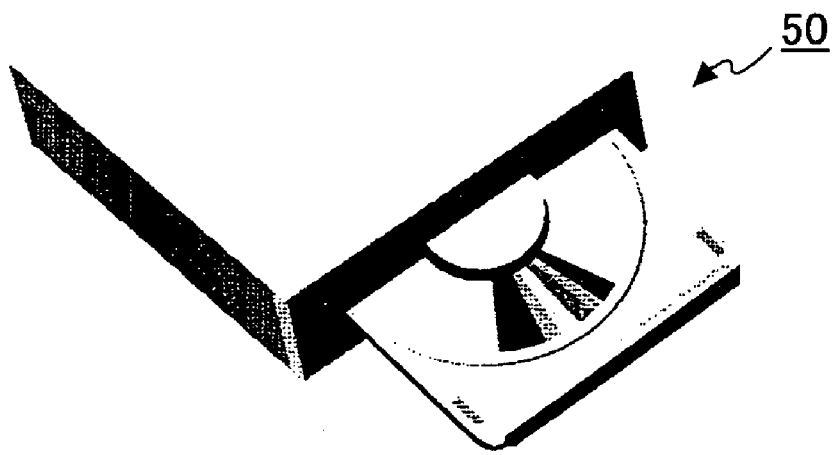

FIG.26
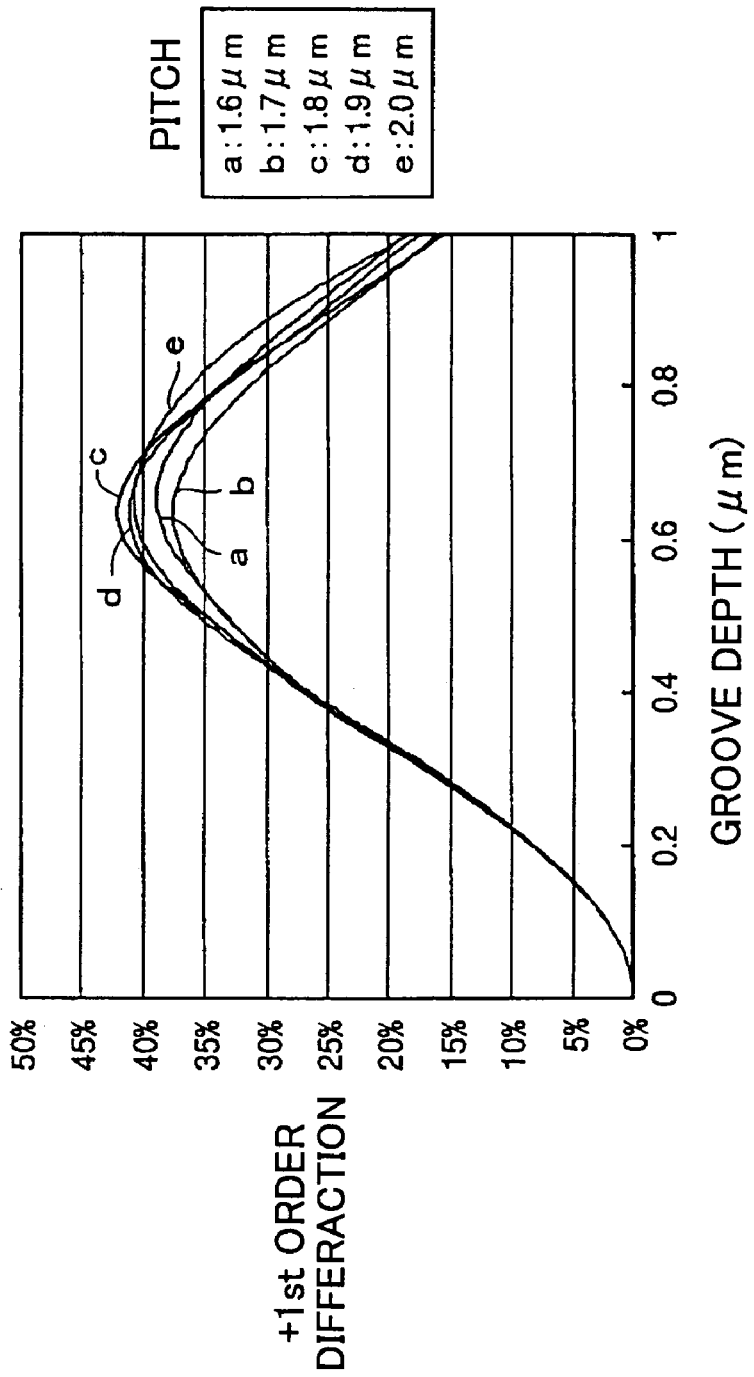
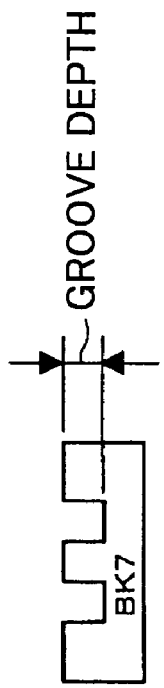

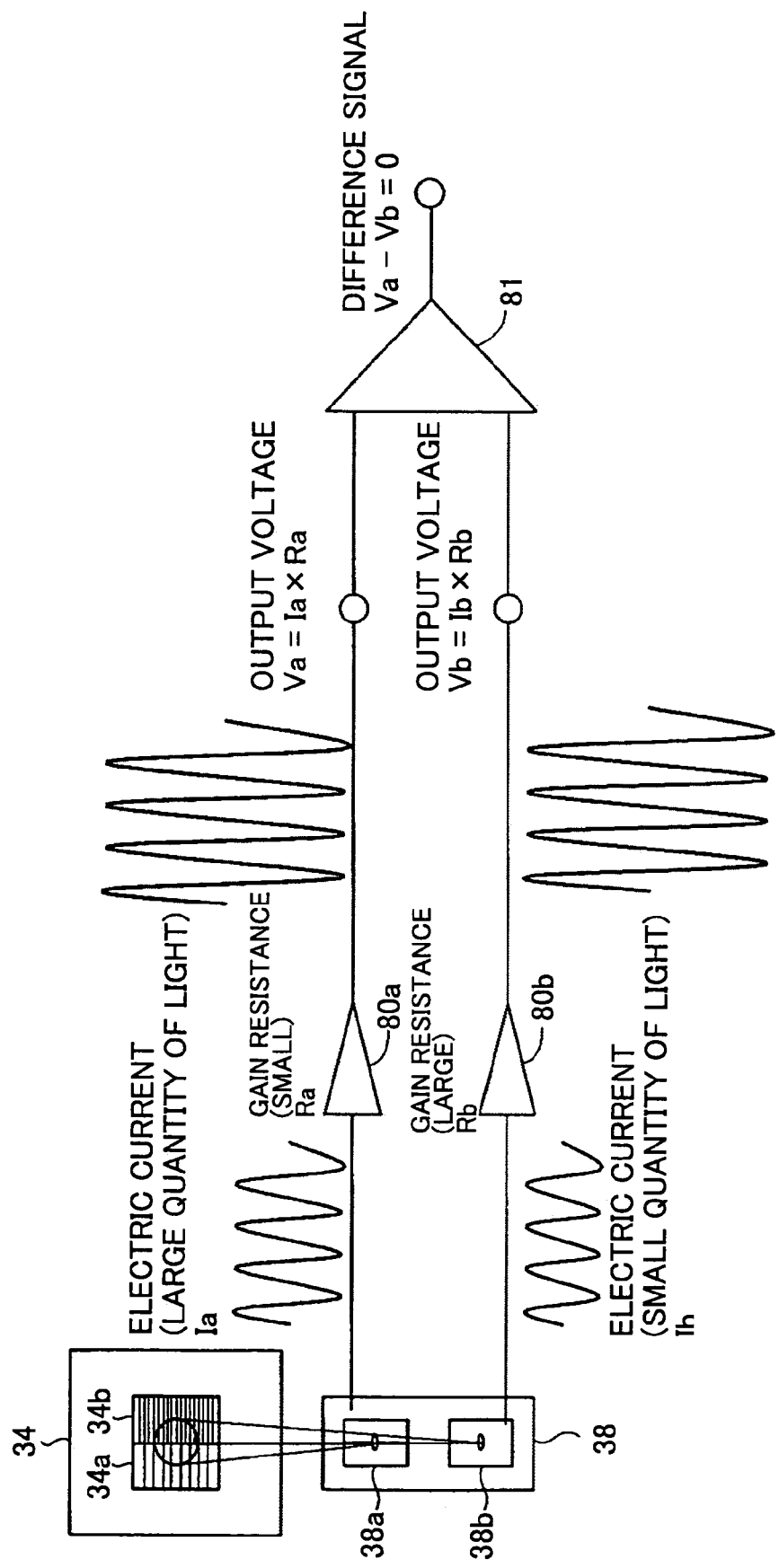

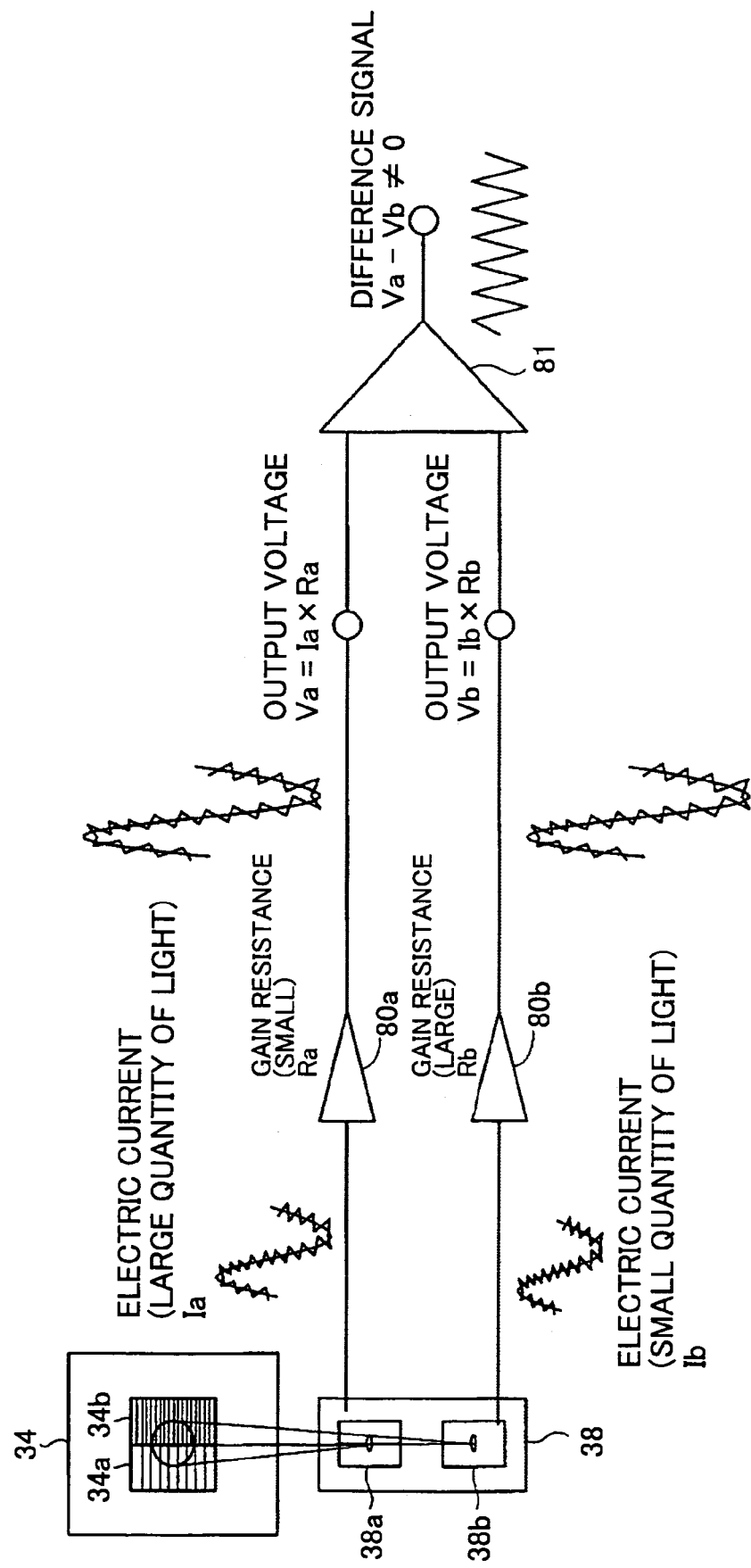

DIFFRACTION GRATING, METHOD OF FABRICATING DIFFRACTION OPTICAL ELEMENT, OPTICAL PICKUP DEVICE, AND OPTICAL DISK DRIVE

BACKGROUND OF THE INVENTION

1. Field of the Invention

The present invention relates to a diffraction grating and an optical pickup used in an optical information processor that can record and reproduce information into and from a plurality of recording media with different standards, such as CD (compact disk), DVD (digital video disk/digital versatile disk), or Blu-Ray disc, using different wavelengths.

The present invention also relates to a diffraction optical element and a fabrication method thereof, as well as to an optical pickup device using the diffraction optical element and an optical disk drive that includes the optical pickup device.

2. Related Art

In an information processor for recording and/or reproducing information into and from a recording medium, a light beam is conventionally used to record and reproduce the information into and from the recording medium. A typical example of optical recording and reproducing is a system using a DVD-standard disk as the optical recording medium, which is commercially available. This system was produced in response to a demand for recording video data with contents of two hours or more and compressed/coded based on MPEG 2 in one side of an optical recording medium with a diameter of 12 cm. Under the DVD standard, the storage capacity of one side of the disk is 4.7 GB, the track density is 0.74 µm/track, and the linear density is 0.267 µm/bit. Hereinafter, a disk based on the above-described DVD standard is referred to simply as a "DVD".

Information recorded on an optical recording medium, such as a DVD, is reproduced using an optical head. With the optical head, the light beam emitted from an LD (or a semiconductor laser) is focused onto the pit line formed on the track of the optical recording medium by an object lens. The light beam reflected from the optical recording medium is guided onto a photodetector by a condensing lens, in which a reproduction signal is generated. The reproduction signal produced by the photodetector is input to a reproduction signal processor to decode the data. In the case of DVD, the wavelength of the LD of the optical head is 650 nm, and the numerical aperture (NA) of the object lens is 0.6.

Blu-Ray Disc is a new standard that improves the density of the DVD standard, using a blue-violet laser with a wavelength of 405 nm. The Blu-Ray Disc standard was proposed for the next-generation large-capacity optical recording medium, which allows a maximum of 27 GB of video data to be repeatedly recorded and reproduced into and from a single layer of one side of a phase-change optical recording medium with a diameter of 12 cm.

For Blu-Ray Disc, a shortwave blue-violet laser is used, and the numerical aperture (NA) of the object lens for condensing the light beam is set to 0.85 in order to reduce the size of the beam spot. The Blu-Ray Disc recording medium employs a transparent protecting layer with thickness of 0.1 mm, in accordance with the increased numerical aperture of the lens. This arrangement reduces the aberration due to inclination of the optical recording medium and reading errors, while improving the recording density. Consequently, the recording track pitch of the optical recording medium can be reduced to 0.32 µm, which is about half of that of the DVD, and the maximum 27 GB of high-density recording is realized on one side of the Blu-Ray optical recording medium.

FIG. 1 is a schematic diagram illustrating a conventional pickup device for recording and reproducing information onto and from an optical recording medium (a DVD). An optical pickup 101 generally employs a polarizing optical system. A PBS (polarizing beam splitter) 104 is placed on the optical path extending from LD (or the light source) 102 to the object lens 106. The light component having the same polarization plane as the linear polarization of the LD 102 passes through the PBS 104, and is rendered to circularly polarized light by a quarter-wave plate 105. The circularly polarized light is focused through the object lens 106 onto the recording layer of the optical recording medium 108, which is formed beneath top surface of the substrate.

The light reflected from the reflecting surface of the optical recording medium 108 is also circularly polarized light, but rotated in the opposite direction to the incident light. The opposite-circularly polarized light passes through the quarter-wave plate 105 and becomes linearly polarized light with a polarization plane perpendicular to the polarization plane of the LD 102. The linearly polarized light is reflected from the PBS 104 and guided to the PD (photodetector) 110 via the condenser 107. When the quarter-wave plate 105 produces perfectly circularly polarized light, the component of the return beam having passed through the PBS 104 becomes zero, and the entire light beam reflected from the optical recording medium 108 is detected by the PD 110.

Meanwhile, a variety of optical pickups, which are used in an optical disk drive (i.e., an optical information processor) and have an optical system including a diffraction grating, have been proposed. In this type of optical pickup, the light beam reflected from the optical recording medium is diffracted by the diffraction grating, and detected by the photodetector. One type of known diffraction grating is a polarizing diffraction grating. For example, JPA 9-50642 discloses an optical head and a fabricating method thereof. In this publication, the optical head device guides the light flux emitted from the light source through the diffraction grating onto an optical recording medium in order to record and reproduce information into and from the optical recording medium. The diffraction grating is formed of an optically anisotropic polymer so as to exhibit the optically anisotropic characteristics.

In recent years, a super-combo drive that is capable of recording and reproducing for both CD and DVD with a single optical disk drive, has been put into practical use. The optical pickup used in a CD/DVD optical disk drive has a semiconductor laser with a wavelength of 790 nm used for CD and a semiconductor laser with a wavelength of 650 nm used for DVD, which are separated from each other. The light fluxes emitted from the semiconductor lasers (with the 650 nm wavelength the 790 nm wavelength) are synthesized on the same optical axis by means of a wavelength synthesizing prism. The synthesized light beam passes through a beam splitter, and is then collimated into parallel light by a collimating lens and made incident on an object lens. The light beam that has passed through the object lens is guided onto and reflected from the information recording surface of the optical recording medium. The reflected light (hereinafter, referred to as "signal light") returns along the incident (forward) optical path.

In other words, the signal light is collimated into parallel light by the object lens, and focused onto the light-receiving surface of the photodetector via the collimating lens and the beam'splitter. The light is then converted into electric signals by the photodetector.

As a semiconductor laser for emitting light at two different wavelengths, a monolithic two-wavelength semiconductor laser is known. In this type of laser, a semiconductor laser of 790 nm wavelength and a semiconductor laser of 650 nm wavelength are monolithically formed in a single chip. Another type of two-wavelength semiconductor laser, in which multiple chips of semiconductor lasers with the respective wavelengths are arranged so that the distance between the light-emitting points becomes 100–300 μm, is also proposed. By using the above-described two-wavelength semiconductor laser, the number of components, the size, and the cost of the optical pickup can be decreased, as compared with a conventional optical pickup using two separated units of semiconductor lasers.

FIG. 2 schematically illustrates the structure of a two-wavelength semiconductor laser with laser chips of two different wavelength arranged very close to each other. The LDs (or semiconductor lasers) 102a and 102b with wavelengths for CD and DVD, respectively, are arranged so that the distance between the light emitting points is 100–300 μm. These laser chips 102a and 102b and PD (photodetector) 110 are packaged into a single package. Diffraction gratings 111a and 111b adapted for CD and DVD, respectively, are positioned in front of the closely arranged LDs 102a and 102b, in order to guide the signal lights to the PD 110 on the return path.

If these LDs 102a and 102b, the PD 110, and the diffraction gratings 111a and 111b are arranged in a single package, the beam diameter of the light for CD and that for DVD overlap each other on the return path, as illustrated in FIG. 2. For this reason, the diffraction grating 111a for CD has to have wavelength selectivity so as not to allow the DVD beam to be diffracted when the CD beam passes through the diffraction grating 111a. Similarly, the diffraction grating 111b for DVD has to have wavelength selectivity so as not to allow the CD beam to be diffracted when the DVD beam passes through the diffraction grating 111b.

In addition, the diffraction gratings 111a and 111b have to be positioned in the vicinity of the LDs 102a and 102b. In order to guide the light to the PD 110 from this close position, the diffraction angle has to be set large at 15–20 degrees. In order to set the diffraction angle large, the grating pitch of the diffraction grating has to be narrowed. In view of the diffraction angle of 15–20 degrees, the pitch has to be set at about 2 microns.

With a diffraction grating having wavelength selectivity, when the wavelength selecting condition and the wavelength are determined, then the diffraction efficiency for the diffracted light with the selected wavelength is uniquely determined. This means that the diffraction efficiency cannot be set freely. To overcome this problem, JPA 2001-281432 discloses that for a wide pitch diffraction grating the maximum diffraction efficiency is obtained when the ratio of the width of the protrusion of the grating to the period is 0.5. Accordingly, JPA 2001-281432 proposes to set the ratio to a value other than 0.5 to decrease the diffraction efficiency, and to set diffraction efficiency arbitrarily in the region below the maximum diffraction efficiency.

However, the method disclosed in JPA 2001-281432 is only applicable to a wide pitch grating. In addition, the diffraction efficiency is only adjustable below the maximum diffraction efficiency. The diffraction efficiency in a narrow pitch region theoretically converges to about 30%, and it is difficult to achieve a diffraction efficiency exceeding this value.

As a technique for increasing the diffraction efficiency of a wide pitch diffraction grating, blazing is known. By blazing the shape of the grating, the efficiency ratio of the diffracted light is varied in the positive and negative directions. The diffraction efficiency can be increased by pulling the grating shape to one side. Although this method is effective for a wide pitch grating, it is not suitable for a narrow pitch grating because it is difficult to form a blaze in a narrow pitch grating due to the small pitch with respect to the depth of the groove. Consequently, it is difficult to provide a high efficiency diffraction grating.

For a recording DVD, a polarizing optical system is generally employed at present, and a polarizing diffraction grating with a return-path diffraction efficiency of about 32% is used. It is deemed that when the processing speed is further increased in the future, the quantity of light detected by the photodetector will become insufficient. In this case, it becomes difficult to realize a high-speed recording drive. If the diffraction efficiency of the polarizing diffraction grating can increase from the current level (32%), the quantity of light detected by the photodetector increases, and accordingly, a DVD recording drive capable of higher speed recording operation will be realized.

For an optical pickup used in an optical disk drive, such as Blu-Ray Disc, with the light source wavelength of 400 nm, a more highly efficient diffraction grating is required. The transmissivity of an optical element (such as a lens), which is 95% at a wavelength of 660 nm, decreases to 90% at a wavelength of 400 nm. In addition, since many optical elements for correcting various aberrations, such as spherical aberration, coma, and other aberrations, are inserted in the optical path, reduction of light quantity occurs every time light flux passes through an optical element. Furthermore, the photoelectric converting efficiency of the photodetector decreases due to decrease in the quantum efficiency caused by short wavelength, and therefore, the quantity of light detectable at the photodiode is further reduced. In view of the large reduction of the quantity of light detected at the photodetector, it is required for an optical pickup used in an optical disk drive using a wavelength of 400 nm to guarantee a diffraction efficiency of 60% or higher. It is difficult to produce such a high-efficiency optical pickup using a narrow pitch diffraction grating.

JPA 2002-288856 discloses an optical pickup using a hologram, as illustrated in FIG. 3. This optical pickup has a semiconductor laser chip 126 for emitting a prescribed light beam. The light beam emitted from the semiconductor laser chip 126 is split by the diffraction grating 125 into three beams, that is, two secondary beams for tracking and a primary beam for reading information signals. Thus, the diffraction grating 125 is used to produce extra tracking beams. These three beams pass through the hologram 124 as zero-order light, are then converted into parallel light by the collimating lens 123, and focused onto the disk (or the recording medium) 121 by the object lens 122. The light guided onto the disk 121 is modulated by the pit formed on the disc 121, and reflected from the disc 121. The reflected light passes through the object lens 122 and the collimating lens 123, and diffracted by the hologram 124. The diffracted light is guided onto the five-part photodiode 127 as first-order light.

In the optical pickup shown in FIG. 3, the hologram 124 is divided into multiple regions 124a and 124b. If the period of the grating varies between the regions, then the groove depth and the grating angle vary between the regions due to difference in etching rate during the hologram fabrication process, which further causes the diffraction efficiency to change between the regions on the hologram 124. Consequently, offset occurs in tracking signals. To overcome this problem, the invention disclosed in JPA 2002-288856 proposes that the multiple regions be arranged symmetrically using the boundary between the regions as the symmetric axis, while the grating periods of the respective regions are consistent with each other. This arrangement reduces variation in groove depth and grating angle, and therefore, variation in diffraction efficiency can be prevented. Especially, well-balanced tracking signals are produced with improved characteristics.

JPA 11-265515 discloses an optical pickup device using a diffraction element as shown in FIG. 4. In this optical pickup, the light emitted from the semiconductor laser 201 is diffracted by the diffraction element 202. The zero-order light component is guided through the polarizing beam splitter 203, the collimating lens 204, and the object lens 205 onto the recording medium 206. The return light reflected from the recording medium 206 passes through the object lens 205 and the collimating lens 204, and strikes the polarizing beam splitter 203. According to the polarization components, a portion of the light beam is reflected by the polarizing beam splitter 203 in the direction perpendicular to the return path, and guided to an optical system (not shown) for detecting information signals. The other portion of the light beam passes through the polarizing beam splitter 203, and is diffracted by the diffraction element 202. The first-order diffracted light is guided onto a light receiving element 207.

In the optical pickup shown in FIG. 4, the diffraction element 202 is divided into multiple regions. If the period (or the pitch) of the grating is large in one region, and small in the other region, as illustrated in the graph shown in FIG. 5A (that computes the distribution of the grating pitch on the diffraction element), then the groove is made deep in the wide pitch region, while the groove is made shallow in the narrow pitch region, during the etching process. The difference in groove depth causes the diffraction efficiency to vary, and offset occurs in tracking signal. To overcome this problem, JPA 11-265515 proposes to arrange the pitches of the grating so that the pitch in the farther region from the light receiving element becomes substantially the same as that in the closer region to the light receiving element, as shown in FIG. 5B, in order to reduce difference in diffraction efficiency. This arrangement allows well-balanced tracking signals to be produced with improved characteristics.

For a rewritable type optical pickup, employing an element that can make use of light at high efficiency is effective means for increasing the operating speed. For example, a polarization splitter having different diffraction efficiencies depending on the polarization directions can increase the light-using efficiency. JPA 2000-75130, which is assigned to the assignee of the present patent application, proposes a polarization splitter with a structure shown in FIG. 6. In this polarization splitter, a birefringent material layer 303 shaped into a periodic protrusion pattern is positioned over a transparent substrate 302. The birefringent material layer 303 is optically anisotropic and has two refractive indices with respect to different polarization planes of the incident light. The transparent substrate 302 and the birefringent material layer 303 are covered with anisotropic overcoat layer 304. The birefringent material layer 303 is made of a macromolecule material (for example, made of a drawn film of an organic polymer). Especially, it is easy for a drawn film of an organic polymer (hereinafter, referred to as an "organic drawn film") to achieve a large area size, as compared with a crystalline material, such as $LiNbO_3$, and therefore the cost can be reduced. The indices of refraction are near 1.6, and a highly transparent isotropic adhesive having a similar index of refraction can be easily obtained. Accordingly, the fabrication process for the polarization splitter is facilitated.

SUMMARY OF THE INVENTION

In view of the above-described background art, it is an object of the present invention to overcome the problems in the prior art techniques and to realize a diffraction grating that is capable of increasing the diffraction efficiency even when the grating pitch is decreased. It is also an object of the invention to provide an optical pickup using the diffraction grating.

It is another object of the invention to provide an arrangement for reducing difference in diffraction efficiency caused by difference in pitch for a diffracting optical element having a grating structure with different pitches or a diffracting optical element comprising multiple grating regions with different pitches.

It is still another object of the invention to provide an arrangement for achieving a uniform diffraction efficiency not only by bringing the diffraction efficiencies of multiple gratings (or grating regions) closer to each other, but also by increasing the entire diffraction efficiency.

It is yet another object of the invention to provide a highly reliable optical pickup device that can reduce signal offset using a diffracting optical element with uniformly high diffraction efficiency between gratings (or grating regions). It is yet another object of the invention to provide an optical disk drive that can detect signals in a stable manner by using the above-described optical pickup device.

To achieve the objects of the invention, in the first aspect of the invention, a diffraction grating with periodically arranged protrusions and grooves is provided. The protrusions are made of a material whose index of refraction is greater than that of the grooves. The ratio of the width D of the protrusion to the pitch Λ of the protrusion is equal to or less than 0.4 (D/Λ≦0.4).

This is effective for a narrow pitch grating.

In the second aspect of the invention, a diffraction grating comprises periodically arranged protrusions and grooves, and the protrusions are made of a material with a refractive index n2, which is greater than the refractive index n1 of the grooves (n2>n1). The ratio of the width D of the protrusion to the pitch Λ of the protrusion satisfies the condition $$D/\Lambda = (1/2)\exp(-3\Delta n^* Q/2)$$

where $\Delta n = n2-n1$, and Q is a value defining the shape and the thickness of the diffraction grating and expressed as $Q=2\pi\lambda T/n\Lambda^2$, where T denotes the depth of the groove, n denotes the average refractive index of the diffraction grating, and λ is the wavelength of light incident on the diffraction grating.

The diffraction gratings defined by the first and second aspects can achieve high diffraction efficiency for zero-order diffracted light and plus/minus first-order diffracted light.

Preferably, the Q value ($Q=2\pi\lambda T/n\Lambda^2$) is greater than 1 (Q>1).

The diffraction grating is formed using a photo mask with a pattern modified so that the bright and dark ratio is offset from 1 and that condition D/Λ≦0.4 is satisfied.

These arrangements can also contribute to improvement of diffraction efficiency for zero-order diffracted light and plus/minus first-order diffracted light.

Preferably, the protrusions are made of a birefringent material, and the grooves are filled with an isotropic medium. The birefringent material is, for example, an organic polymer. In this case, the protrusions and grooves are formed by etching a drawn film of organic polymer. The birefringent material may also be liquid crystal. By using these materials, the diffraction efficiency can be adjusted depending on the angle of the polarization plane of the incident light. For example, the light can pass through the diffraction grating in the forward path, and is diffracted on the return path.

The diffraction grating allows a first light beam with wavelength of λ1 to pass through, and diffracts a second light beam with wavelength of λ2.

In the third aspect of the invention, an optical pickup using the above-described diffraction grating is provided. The optical pickup comprises a light source, a condensing lens for guiding the light beam emitted from the light source onto an optical recording medium, a diffraction grating positioned on the optical path extending between the light source and the optical recording medium, and a photodetector for receiving a portion of the light beam reflected from the optical recording medium and diffracted by the diffraction grating. The diffraction grating has periodically arranged protrusions and grooves. The protrusions are made of a material having an index of refraction greater than that of the grooves. The ratio of the width D of the protrusion to the pitch Λ of the protrusion is equal to or smaller than 0.4 (D/Λ≦0.4).

Alternatively, the diffraction grating used in the optical pickup device is one described in the above second aspect of the invention.

Preferably, the light source, the photodetector, and the diffraction grating are formed in a single unit.

The above-described optical pickup device is capable of high-speed recording and reproducing, while the assembling time can be shortened and the adjustment of the optical system can be facilitated.

In the fourth aspect of the invention, a diffraction optical element having a grating with a variable pitch (or period) is provided. In this grating with the variable pitch, the duty is also variable, where "duty" denotes the ratio of the width of a protrusion of the grating to the pitch of the grating. With this arrangement, the diffraction efficiency of the grating can be set uniform throughout the entire grating by adjusting the duty.

In other words, the duty of the grating is determined so that the diffraction efficiency of the grating with a variable pitch becomes uniform as a whole.

The optical diffraction element has a first grating portion with a first pitch and a second grating portion with a second pitch that is greater than the first pitch. In this case, the grating is formed of a birefringent material, and the duty of the first grating portion is set smaller than that of the second grating portion, depending on the birefringence of the birefringent material.

Alternatively, the duty of the first grating portion is set greater than that of the second grating portion, depending on the birefringence of the birefringent material forming the grating.

This arrangement can achieve uniform diffraction efficiency between two or more grating portions with different pitches, while maintaining the entirety of diffraction efficiency high.

In the fifth aspect of the invention, a diffraction optical element divided into two or more grating regions is provided. Each of the grating regions has a grating with a prescribed pitch which is different from pitches of the other grating regions. Each of the grating regions has a different duty, where "duty" denotes the ratio of the width of a protrusion of the grating of the grating region to the pitch of the grating. With this arrangement, the diffraction efficiencies of the grating regions can be set uniform by adjusting the respective duties.

For example, the duty of each of the grating regions is determined so that the diffraction efficiencies of the grating regions become substantially equal.

The grating formed in each grating region is made of a birefringent material. For the grating region having the smallest pitch, the duty is set less than the duties of the other grating regions, or alternatively, it may be set greater than the duties of the other grating regions, depending on the birefringence of the birefringent material. This arrangement can achieve uniform diffraction efficiency between two or more grating regions, while maintaining the entirety of diffraction efficiency high.

In the diffraction optical element provided in the fourth and fifth aspects, the gratings are made of an optically anisotropic and birefringent material, each grating comprising alternately arranged protrusions and grooves, and the grooves are filled with an isotropic material. By filling the grooves made in the optically anisotropic and birefringent material with the isotropic material, while adjusting the duty of each grating taking into account the associated pitch, the entire diffraction efficiency of the diffraction optical element can be made uniform, and simultaneously, high diffraction efficiency can be maintained. The fabrication cost can also be reduced.

The optically anisotropic and birefringent material is, for example, a drawn film of an organic polymer. Since the index of refraction of the drawn film of an organic polymer is about 1.6 (when λ=660 nm), which is relatively low, the index of refraction of the isotropic material filling the grooves can be set across a wide range. In addition, the transparency of the isotropic material is high, and light can be made use of efficiently.

Alternatively, the gratings may be made of an optically isotropic material, each grating comprising alternately arranged protrusions and grooves. The grooves are filled with an optically anisotropic and birefringent material. By filling the grooves formed in the isotropic material with the optically anisotropic and birefringent material, while adjusting the duty of each grating taking into account the associated pitch, the entire diffraction efficiency of the diffraction optical element can be made uniform, and simultaneously, high diffraction efficiency can be maintained. The manufacturing cost can also be reduced.

The optically anisotropic and birefringent material filled in the grooves is, for example, liquid crystal.

In the sixth aspect of the invention, a method for fabricating a diffraction optical element that includes a grating comprised of alternately arranged protrusions and grooves is provided. In this method, a photo mask having a grating pattern with a variable pitch and with a duty variably adjusted in accordance with the pitch is prepared. The mask duty corresponds to a ratio of the width of the protrusion of the grating to the protrusion pitch. Then, the grating is formed using the photo mask. The mask duty is variably adjusted so that the diffraction efficiency of the grating becomes uniform throughout the entire grating.

In the seventh aspect of the invention, a method for fabricating a diffraction optical element divided into two or more grating regions, each grating region including a grating with a different grating pitch, is provided. In this method, a photo mask having a grating pattern divided into two or more sub-regions, each sub-regions having a different mask pitch and a different mask duty, is prepared. The mask duty corresponds to a ratio of the width of a protrusion of the grating to a protrusion pitch. Then, the grating is formed using the photo mask. The mask duty of each sub-region is determined so that the diffraction efficiency of the diffraction optical element becomes uniform throughout the two or more grating regions.

With the methods in the sixth and seventh aspects, almost all the conventional process can be used simply by changing the mask design so that the duty of the grating pattern on the mask is varied in accordance with the variable pitch or the different pitches among the grating regions. Accordingly, the diffraction optical element can be fabricated at low cost.

In the eighth aspect of the invention, an optical pickup device using the diffraction optical element described in the fourth or the fifth aspect of the invention is provided. To be more precise, the optical pickup device comprises a light source for emitting a light beam, a condensing lens for guiding the light beam onto an optical recording medium, a diffraction optical element positioned on an optical path extending between the light source and the optical recording medium, and a photodetector for receiving a portion of the light beam reflected from the optical recording medium and diffracted from the diffraction grating. When using the diffraction optical element of the fourth aspect of the invention, the diffraction optical element has a grating with a variable pitch, and a duty of the grating being set variable in accordance with the pitch, where the duty denotes a ratio of the width of a protrusion of the grating to the pitch of the grating.

The diffraction optical element used in the optical pickup device may be one described in the fifth aspect of the invention.

Such an optical pickup device can reduce variation in diffraction efficiency among portions or grating regions, as well as offset due to a noise component. Consequently, stable signal detection is carried out, and the reliability is improved.

BRIEF DESCRIPTION OF THE DRAWINGS

Other objects, features, and advantages of the present invention will become more apparent from the following detailed description when read in conjunction with the accompanying drawings, in which:

FIG. 17A and FIG. 17B illustrate an example of the relation between the grating pitch and the duty of the hologram of the diffraction optical element shown in FIG. 15;

FIG. 24 illustrates a notebook personal computer and an optical disk drive mounted in the computer;

FIG. 26 is a graph showing the diffraction efficiency as a function the depth of the groove obtained when a grating comprising protrusions and grooves is formed on BK7 glass at a variable pitch;

FIG. 29 illustrates a technique for correcting the difference in diffraction efficiency by varying the gain of the signal detection system; and FIG. 30 illustrates the problem in the technique shown in FIG. 29.

DETAILED DESCRIPTION OF THE EMBODIMENTS

The preferred embodiments of the present invention are next described with reference to the attached drawings.

FIRST EMBODIMENT

Figure 7:
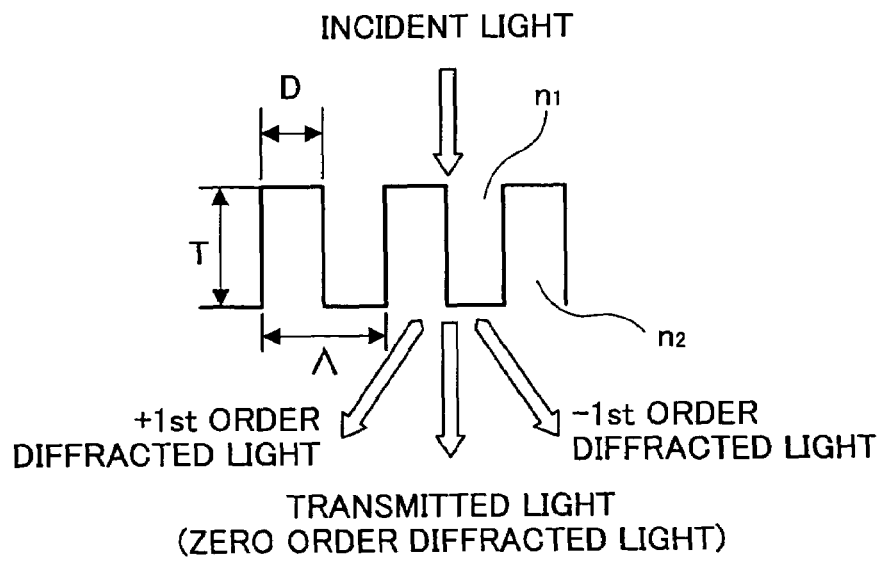
FIG. 7 illustrates a part of the diffraction grating having protrusions and grooves according to the first embodiment of the invention.

FIG. 7 illustrates a part of the diffraction grating having protrusions and grooves according to the first embodiment of the invention. The diffraction grating is formed by forming a transparent film, such as SiO2 film, on the substrate (not shown) and by etching a portion of the transparent film so as to form the grooves. In this example, the groove has a rectangular cross-sectional shape. The pitch Λ of the diffraction grating, which is the distance between the centers of the adjacent protrusions, is 8 microns (Λ=8 μm), and the depth T of the groove is 1 micron (T=1 μm). The incident side of the diffraction grating is the atmosphere, and the refractive index n1 is 1 (n1=1). The light transmission side of the diffraction grating is SiO2, and the refractive index n2 is 1.45 (n2=1.45). A monochromatic light beam with wavelength 0.66 microns (λ=0.66 μm) strikes the incident side of the diffraction grating, and the zero order diffracted light and the plus/minus first-order diffracted light are measured on the light transmission side. The width of the higher refractive index portion (i.e., the protrusion made of SiO2 in this example) of the diffraction grating is denoted as D, and the ratio of D to the pitch Λ (D/Λ) is considered.

Figure 8:
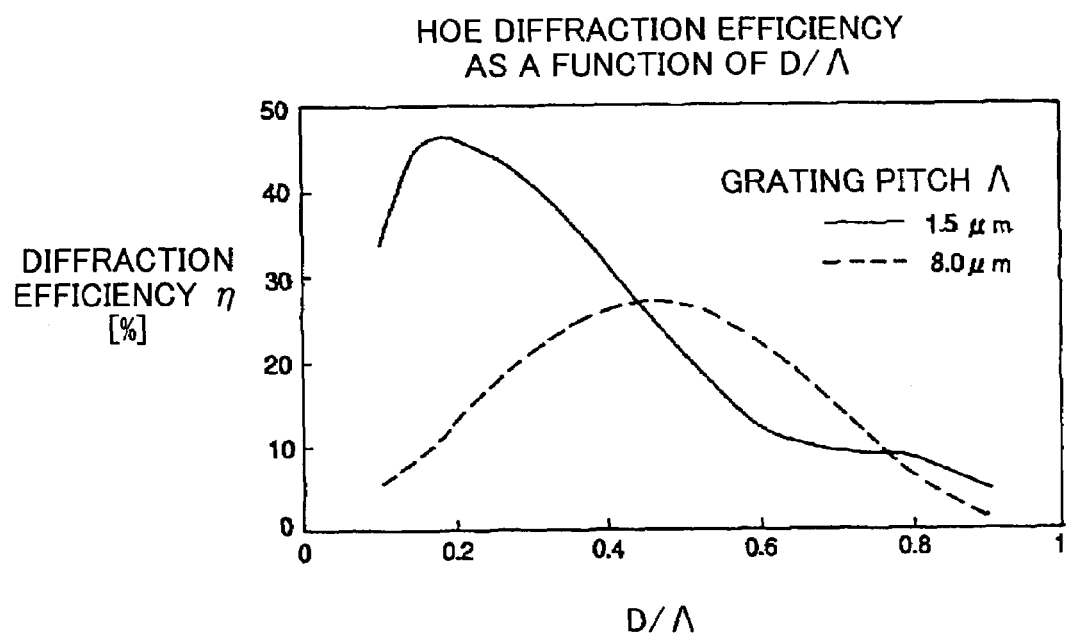
FIG. 8 is a graph showing the diffraction efficiencies of the plus/minus first-order diffracted light as a function of $D/\Lambda$, at fixed pitches $\Lambda$.

FIG. 8 is a graph showing the diffraction efficiencies of plus/minus first-order diffracted light, as a function of D/Λ, at fixed pitches Λ. The dashed line in the graph represents the diffraction efficiency at a pitch of 8 μm, and the solid line represents the diffraction efficiency at a pitch of 1.5 μm. At a pitch of 8 microns, the diffraction efficiency becomes maximum of 26.4% when D/Λ is slightly less than 0.5. As D/Λ further increases beyond this value, the diffraction efficiency starts decreasing. The same applies when D/Λ becomes less than the above-described value. When the pitch of the grating is set to 1.5 microns, the diffraction efficiency is 20.9% when D/Λ is 0.5; however, this value is not the maximum. As D/Λ decreases, that is, as the width D of the SiO2 protrusion become smaller, the diffraction efficiency increases. The diffraction efficiency reaches 46.0% when D/Λ is near 0.2, which greatly exceeds the maximum diffraction efficiency 26.4% obtained at the pitch of 8 microns. At a narrow pitch, higher diffraction efficiency can be obtained by adjusting D/Λ so as to take an appropriate value other than 0.5.

From the graph, it is understood that the diffraction efficiency becomes the maximum when D/Λ is at or below 0.4 in a narrow-pitch grating. Accordingly, by setting D/Λ at or below 0.4, the plus/minus first-order diffraction efficiency can be increased.

With the diffraction grating comprising periodically arranged protrusions and grooves, the pitch of the protrusion of the grating is Λ, the depth of the groove is T, the average index of refraction of the diffraction grating is n, and the wavelength of the light source is λ then, Q is defined as $2\pi\lambda T/n\Lambda^2$ ($Q=2\pi\lambda T/n\Lambda^2$). In addition, the difference between the smaller index of refraction n1 (of the groove in this example) and the greater index of refraction n2 (of the protrusion in this example) is represented as $\Delta n$ ($\Delta n = n2-n1$). Then, the value D/Λ that produces the maximum diffraction efficiency (denotes as D/Λmax) for plus/minus first-order diffracted light is expressed by equation (1), which is found from various experimental results and computation.

$$D/\Lambda max = (1/2)\exp(-3\Delta n^* Q/2). \quad (1)$$

When the pitch is set to 8 microns (Λ=8 μm) D/Λmax calculated from equation (1) is 0.48. At the pitch of 1.5 microns (Λ=1.5 μm), D/Λmax calculated from equation (1) becomes 0.18. These are consistent with FIG. 8. By adjusting D/Λ of an arbitrary diffraction grating so as to approach the calculated D/Λmax value, a diffraction grating exhibiting a greater plus/minus first-order diffraction efficiency can be realized, as compared with a conventional diffraction grating having the maximum diffraction efficiency at D/Λ of 0.5.

The Q value is used in order to take the thickness of the grating into account.

As has been described above, the Q value is expressed by equation (2).

$$Q = 2\pi\lambda T/n\Lambda^2 \quad (2)$$

where λ denotes the wavelength of the light source, T denotes the depth of the groove of the grating, n denotes the average index of refraction of the diffraction grating, and Λ denotes the pitch of the diffraction grating.

The gratings can be grouped into three categories depending on the thickness. If Q is smaller than 1 (Q<1), the grating is considered as a thin and planar-type grating. If Q is greater than 10 (Q>10), the grating is considered as a thick and bulk-type grating. If Q is between 1 and 10 (1≦Q≦10), the grating is of an intermediate type between a planar type and a bulk type. In the example shown in FIG. 8, when the pitch is set to 8 microns (Λ=8 μm) Q equals 0.05 (Q=0.05), and a thin planar-type grating is used. When the pitch is set to 1.5 microns (Λ=1.5 μm), Q equals 1.5 (Q=1.5), and an intermediate type grating is used. For the thin planar-type grating with pitch of 8 microns, the effect of improved plus/minus first-order diffraction efficiency through adjustment of D/Λ does not come into view. In contrast, the effect of improved plus/minus first-order diffraction efficiency through adjustment of D/Λ becomes conspicuous for an intermediate type grating with a pitch Λ of 1.5 μm.

For the intermediate type and the thick bulk-type gratings, that is, for the range of Q value greater than 1 (Q>1), the improvement of the diffraction efficiency by adjustment of D/Λ is conspicuous. In other words, the diffraction efficiency can be increased for a diffraction grating with a Q value exceeding 1, by adjusting D/Λ so as to be at or below 0.4.

Figure 9A:
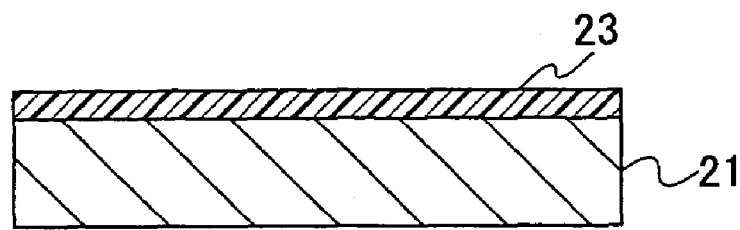
FIG. 9A through FIG. 9F illustrate an example of the fabrication process of the non-polarizing diffraction grating.
Figure 9B:
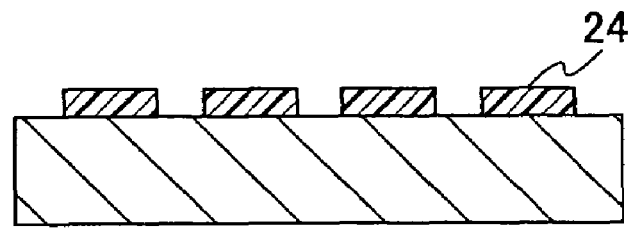

FIG. 9A through FIG. 9F illustrate an example of the fabrication process of a diffraction grating. As illustrated in FIG. 9A, a photoresist layer 23 is formed over a transparent substrate 21 by spin coating or other suitable methods. The photoresist layer 23 is exposed to light through a photo mask with a prescribed grating pattern, and developed into a resist pattern 24, as illustrated in FIG. 9B. At this time, the line and space (the dark and bright) ratio of the exposed grating pattern is adjusted from 1/1 so that D/Λ of the resultant diffraction grating becomes a prescribed value.

Figure 9C:
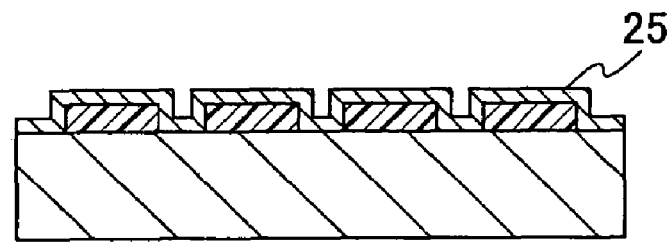
Figure 9D:
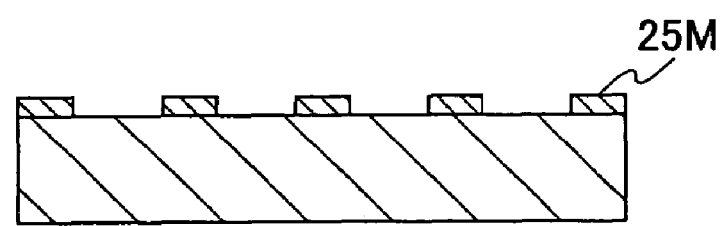

Then, as illustrated in FIG. 9C, a metal layer 25 is formed over the resist pattern 24 by vacuum evaporation, sputtering, or other methods. The metal layer is made of, for example, aluminum or chromium. Then, the resist pattern 24 is removed by dissolving the resist into an organic solvent, such as acetone, or by decomposition using oxygen plasma. Then, the metal mask 25M is left on the transparent substrate 21, as illustrated in FIG. 9D. The metal mask 25M is used in the subsequent dry etching process.

Figure 9E:
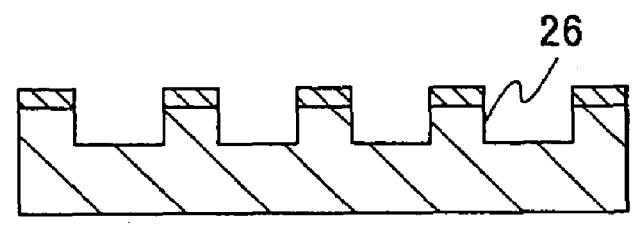
Figure 9F:
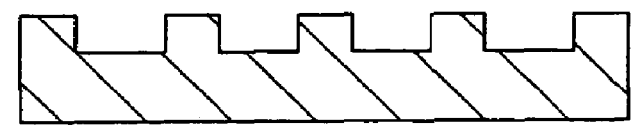

The transparent substrate 21 with the metal mask pattern 25M is placed in a dry etching chamber to carry out dry etching, such as ion beam etching, reactive ion etching, or plasma etching, as illustrated in FIG. 9E. When the transparent substrate 21 is etched to a prescribed depth, the metal mask 25M is removed by an acid. Then, a diffraction grating with a prescribed D/Λ ratio is obtained, as illustrated in FIG. 9F.

With this fabrication process the conventional process can be used almost as it is, without much change. Only the dark and bright ratio of the exposure pattern is changed from 1/1 by using a photo mask with an exposure pattern ratio offset from 1/1, in order to form a diffraction grating with a prescribed D/Λ value. The resulting diffraction grating can achieve improved diffraction efficiencies for zero order diffracted light and plus/minus first-order diffracted light.

Figure 10:
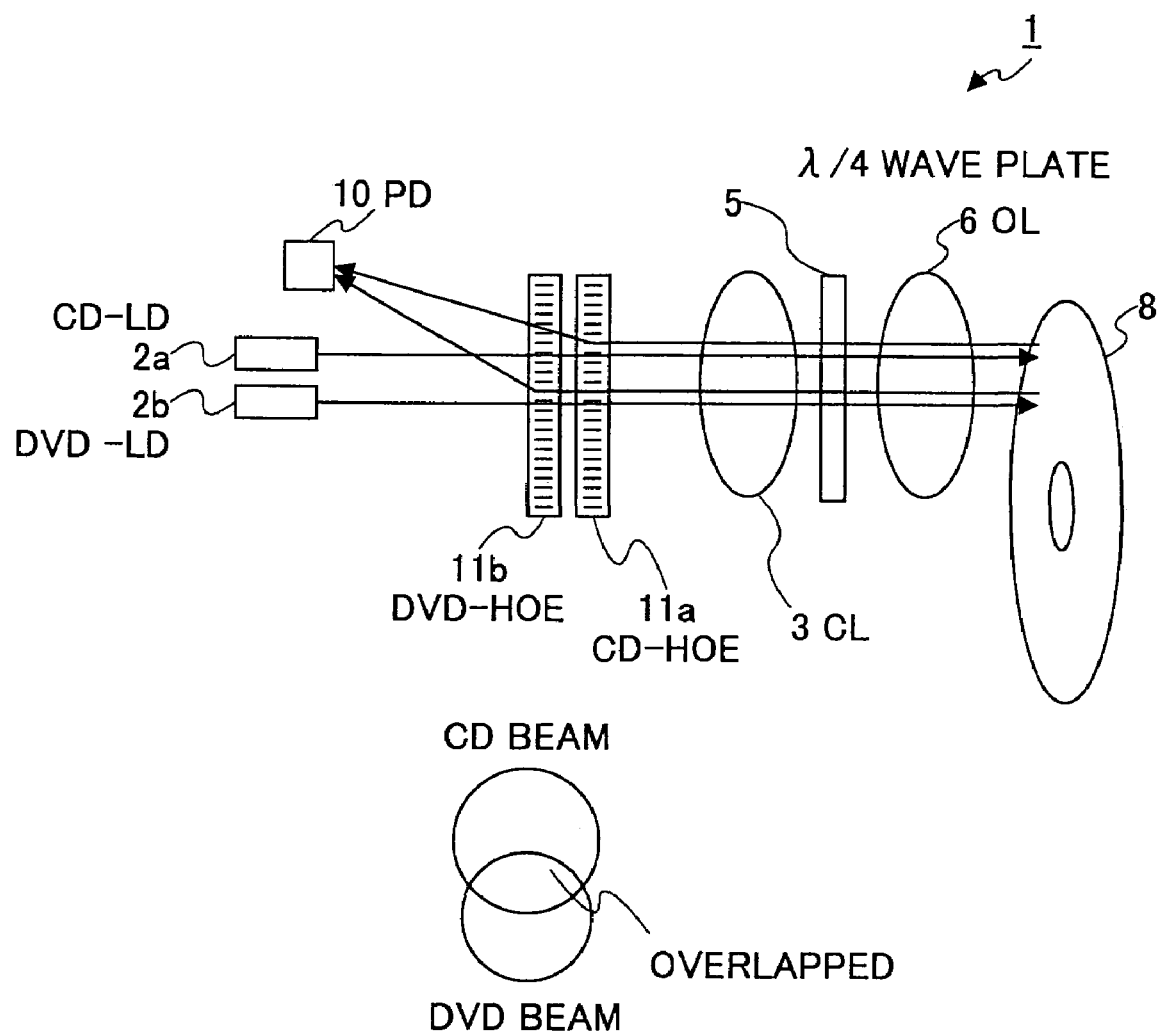
FIG. 10 illustrates an optical pickup having an LD unit and a PD unit arranged on the CD/DVD common optical path in which diffraction gratings for CD and DVD are also inserted.

FIG. 10 is a schematic diagram showing the structure of an optical pickup 1 having diffraction gratings (HOE) 11a and 11b for CD and DVD, respectively, arranged on the CD/DVD common optical path. The optical pickup 1 also has an LD unit 2 and a PD unit 10. A laser diode 2a for CD and a laser diode 2b for DVD are arranged close to each other at a separation of 100 microns to 300 microns. The CD laser diode 2a emits a light beam for CD with a wavelength of 780 nm. This light beam passes through the CD-HOE 11a and the DVD-HOE 11b at a spread angle of θCD. The CD light beam further passes through the collimating lens 3, the quarter-wave plate 5, and the object lens 6, and strikes the information recording surface of the optical recording medium 8.

The CD light beam is reflected from the information recording surface of the optical recording medium 8. This reflected light is referred to as signal light. The signal light passes through the object lens 6, the quarter-wave plate 5, and the collimating lens 3, and enters the CD-HOE 11a and the DVD-HOE 11b. On the return path, the signal light of the CD light beam is diffracted by the CD-HOE 11a, while it is transmitted through the DVD-HOE 11b. On the contrary, the signal light of the DVD light beam emitted from the DVD-LD 2b passes through the CD-HOE 11a, and is diffracted by the DVD-HOE 11b. The signal light beams diffracted by the associated HOEs 11a and 11b at different wavelengths for CD and DVD are detected by the photodetector (PD) 10. In other words, the PD 10 measures the quantities of light beams for CD and DVD reflected from the optical recording medium 8.

In the CD/DVD common path, the CD optical system is a non-polarizing optical system, while a polarizing optical system is employed for the DVD system. Accordingly, the CD-HOE 11a is a non-polarizing diffraction grating, and it is required to have the zero order diffraction efficiency of 95% or higher with respect to the DVD light beam on the return path. The CD-HOE 11a is also required to have a zero order diffraction efficiency of 80% or higher, as well as a first order diffraction efficiency of 8% or higher, with respect to the CD light beams if the CD-writing pickup is used.

Figure 11:
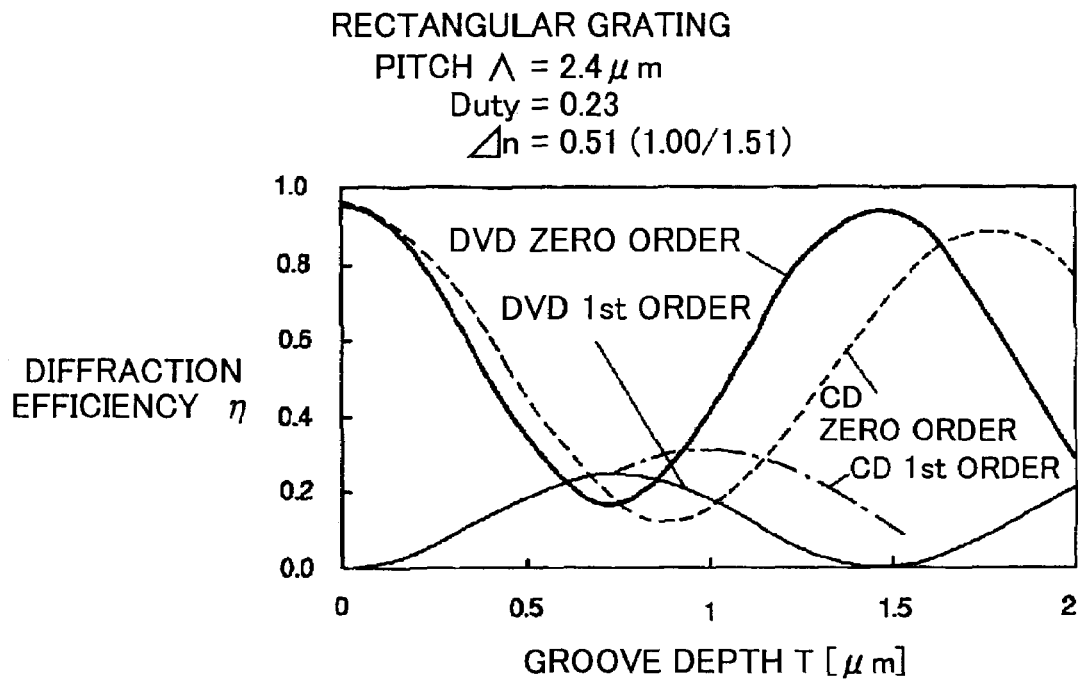
FIG. 11 is a graph of the diffraction efficiencies of the CD-HOE shown in FIG. 10 with respect to the zero-order diffracted light beams for the CD and DVD systems, as well as to the first-order diffracted light beams for the CD and DVD system, as a function of the depth of the groove of the diffraction grating.

Under these conditions, the non-polarizing CD-HOE is designed, using BK7 with a refractive index n2 of 1.51 (n2=1.51) as the material. The difference $\Delta n$ of the refractive indexes of the grating is 0.51 ($\Delta n$=0.51), and the average index of refraction n of the grating is 1.26 (n=1.26). The grating has a rectangular cross-sectional shape with a pitch Λ of 2.4 microns (Λ=2.4 μm). The ratio D/Λ is set to 0.23 (D/Λ=0.23). FIG. 11 is a graph showing the zero order and the first order diffraction efficiencies for the DVD light beam (with wavelength λ of 0.66 microns), as well as the zero order and the first order diffraction efficiencies for the CD light beam (with wavelength λ of 0.78 microns), as a function of the groove depth T of the above-described rectangular grating (CD-HOE). Since the wavelength selecting CD-HOE allows the DVD light beams to pass through, while allowing a portion of the CD light beam to be diffracted, the depth T of the groove is set to near 1.5 microns, at which the zero order diffraction efficiency for the DVD light beam exhibits the second peak, as illustrated in FIG. 11. With the groove depth T of 1.55 microns (T=1.55 μm), the zero order diffraction efficiency of 95% is achieved for the DVD light beam, the zero order diffraction efficiency of 81% is achieved for the CD light beam, and the first order diffraction efficiency for the CD beam is 9.1%.

In general, when designing a diffraction grating, the diffraction efficiency is determined in a simplified manner through algebraic computation based on the scalar diffraction theory. In the scalar diffraction theory, the zero order diffraction efficiency $\eta_0$ and the plus/minus first order diffraction efficiency $\eta_1$ at wavelength of λ are expressed by equations (3) and (4), respectively.

$$\eta_0 = (2D/\Lambda - 1)^2 * \sin^2 \theta + \cos^2 \theta \qquad (3)$$

$$\eta_1 = 4(\sin(\pi D/\Lambda)/\pi)^2 * \sin^2 \theta \qquad (4)$$

where θ denotes the phase change and is expressed by equation (5).

$$\theta = \pi/\lambda * \Delta nT \qquad (5)$$

Using equations (3) and (5), the zero order diffraction efficiency for the DVD light beam is computed, as a function of the groove depth T of the diffraction grating designed based on the above-described conditions. The computation result is shown by the bold curve in the graph of FIG. 12. It is noted that the computation is carried out with the ratio D/Λ of 0.5. The diffraction efficiency obtained from the scalar calculation represented by equation (3) exhibits a periodic cosine function, showing the second peak at the groove depth T of 1.3 microns.

Figure 12:
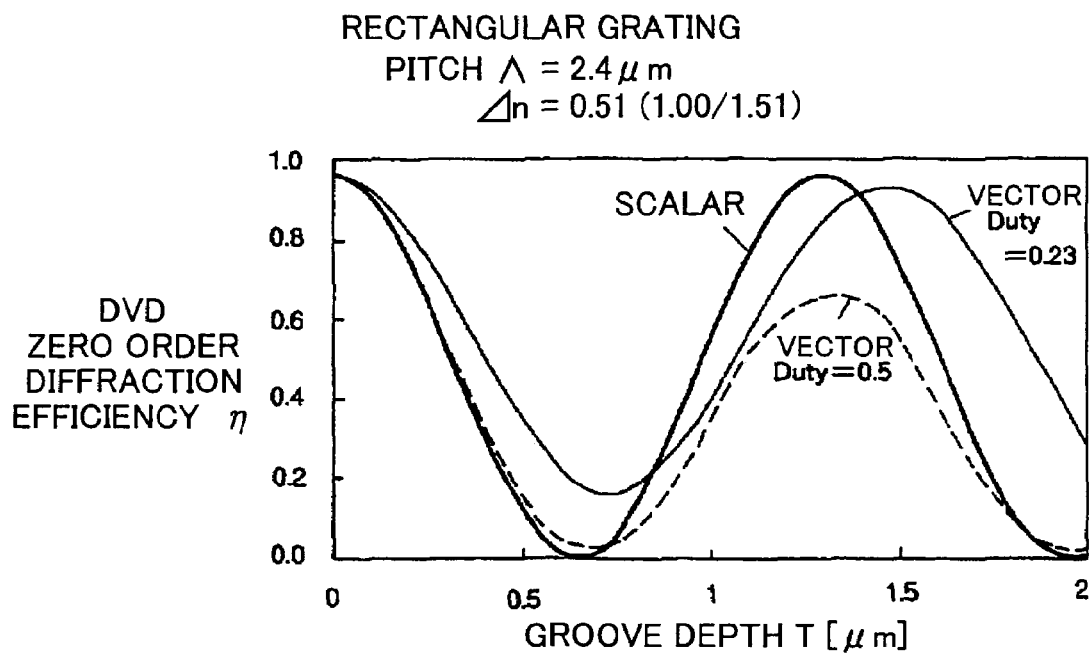
FIG. 12 is a graph of the scalar diffraction efficiency and the vector diffraction efficiency of the CD-HOE with respect to the zero-order diffracted light for the DVD system, as a function of the depth of the groove.

However, in the actual grating, the bold curve shown in FIG. 12 cannot be achieved, and the curve of the dashed line is obtained. The dashed curve is obtained through the RCWA (rigorous coupled wave analysis) method, and it is consistent with the actually measured data. The fall of the second peak of the zero order diffraction efficiency is due to occurrence of even-numbered order diffracted light, which is not taken into account in the scalar computation. The dashed curve shown in FIG. 12 is plotted through the RCWA method by setting the ratio D/Λ to 0.5. When adjusting the ratio D/Λ to 0.23 (D/Λ=0.23), the second peak of the zero order diffraction efficiency for the DVD light beam rises, as indicated by the solid line in FIG. 12. In this case, the second peak occurs at the groove depth T of 1.45 microns (T=1.45 μm). It is understood that the peak is greatly increased as compared with the case in which the ratio D/Λ is set to 0.5, and the peak value approaches that of the scalar computation. In this manner, by adjusting the ratio D/Λ to an appropriate value less than 0.4, the diffraction efficiency can be improved greatly.

Figure 13A:
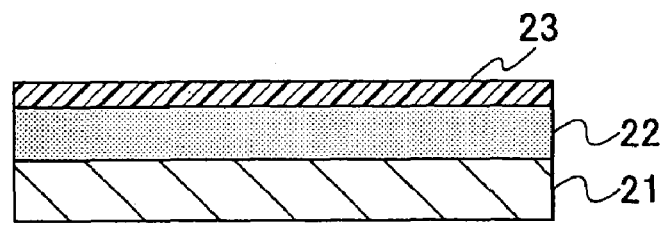
FIG. 13A through FIG. 13G illustrate an example of the fabrication process of the polarizing diffraction grating.

FIG. 13A through FIG. 13G illustrate an example of the fabrication process of a polarizing diffraction grating. First, as illustrated in FIG. 13A, a birefringent material layer 22 is formed over a transparent substrate 21, such as an optical glass plate. A birefringent film may be bonded onto the transparent substrate 21, or alternatively, the birefringent material layer 22 may be formed by spin coating or a physical film-formation technique, such as vacuum evaporation or sputtering. Then, a photoresist layer 23 is formed over the birefringent material layer 22 by, for example, spin coating.

Figure 13B:
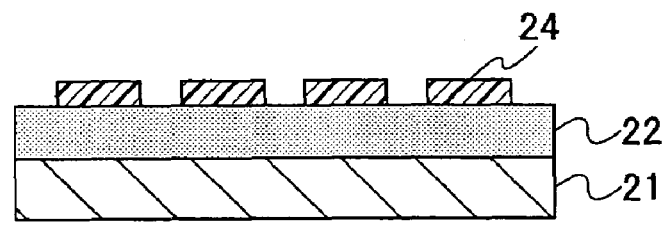

The photoresist layer 23 is exposed to light through a photo mask and developed into a resist pattern 24, as illustrated in FIG. 13B. The line and space ratio of the grating pattern used in the exposure is offset from 1/1, and adjusted to an appropriate ratio so as to realize a desired D/Λ ratio, as in the fabrication process shown in FIG. 9B.

Figure 13C:
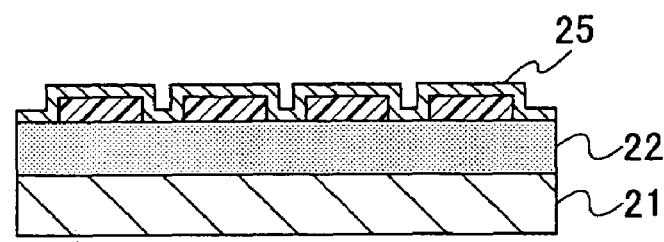
Figure 13D:
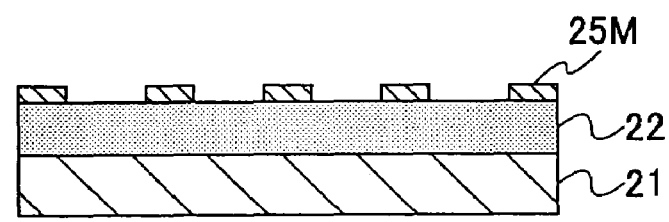

Then, as illustrated in FIG. 13C, a metal layer 25 is formed over the resist pattern 24 by vacuum evaporation, sputtering, or other methods. The metal layer 25 is made of, for example, aluminum or chromium. Then, the resist pattern 24 is removed by dissolving the resist into an organic solvent, such as acetone, or by decomposition using oxygen plasma. Then, the metal mask 25M is left on the birefringent material layer 22, as illustrated in FIG. 13D. The metal mask 25M is used in the subsequent dry etching process.

Figure 13E:
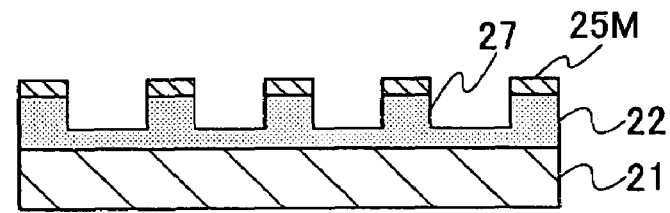

The substrate 21, on which the birefringent material layer 22 and the metal mask pattern 25M are formed, is placed in a dry etching chamber to form grooves in the birefringent material layer 22 by dry etching, such as ion beam etching, reactive ion etching, or plasma etching, as illustrated in FIG. 13E. When the birefringent material layer 22 is etched to a prescribed depth, the metal mask 25M is removed by an acid. Then, a diffraction grating with a rectangular cross-sectional shape is formed in the birefringent material layer 22 at prescribed D/Λ, as illustrated in FIG. 13F.

Figure 13F:
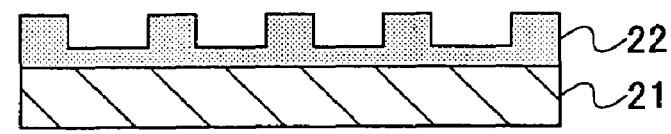
Figure 13G:
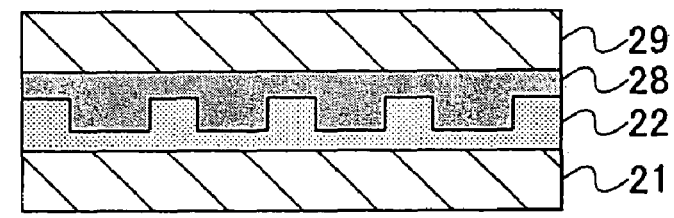

Finally, the birefringent grating is covered with an isotropic material 28, which is then covered with a transparent substrate 29, as illustrate in FIG. 13G. It is desired that the index of refraction of the isotropic material 28 be equal or similar to either the ordinary-ray refractive index or the extraordinary-ray refractive index of the birefringent material, from the viewpoint of increasing the transmissivity and the diffraction efficiency. The top transparent substrate 29 is not necessarily required as long as the flatness of the isotropic material layer 28 is guaranteed.

In the fabrication process shown in FIG. 13A through FIG. 13G, a lift-off technique is used to form a metal mask 25M for dry etching; however, the method is not limited to this example. For example, a metal layer 25 may be formed directly over the birefringent material layer 22. In this case, the photoresist layer is subjected to exposure and development to form a resist mask defining a grating pattern over the metal layer 25. The metal layer is etched using the photoresist mask. Then, the birefringent layer 22 is etched using the metal mask 25M as shown in FIG. 13E, and the metal mask 25M is removed after the etching, as shown in FIG. 13F. With this modification, a polarizing diffraction grating with high diffraction efficiency and a desired D/Λ ratio can be fabricated.

A type of birefringent material that is transparent to the light may be used. For example, an organic material or a drawn film of organic polymer can be used. Examples of organic polymer include polyester, polyamide, polyethylene, polycarbonate, poly(vinyl alcohol), poly(methyl methacrylate), polystyrene, polysulfone, polyether sulfone, and polyethylene terephthalate. Especially, drawn films of PET (polyethylent terephthalate) and PC (polycarbonate) are suitably used for the birefringent material layer because the birefringence $\Delta n_B$ represented by the difference in refractive indexes in the drawn direction and a direction perpendicular to the drawing is as large as 0.1.

In place of the birefringent material layer, liquid crystal may be used in the fabrication process shown in FIG. 13A through FIG. 13G. When using liquid crystal, a transparent substrate is subjected to orientation treatment, and light-setting liquid crystal is applied uniformly onto the orientation-film-coated substrate. The liquid crystal is exposed to light to print a grating pattern in alignment with the orientation direction. The line and space ratio of the grating pattern is offset from 1/1 during the exposure, and adjusted so that the D/Λ ratio of the resultant grating becomes a desired value. After the exposed portion has been set, the hardened portion is removed, and the protrusions and grooves are formed in the liquid crystal layer. The grooves are filled with an isotropic material, and a transparent substrate is bonded onto the top surface of the isotropic material layer. In this manner, the polarizing diffraction grating is formed using liquid crystal.

Another example for fabricating a liquid crystal polarizing diffraction grating is described below. A pair of transparent substrates that have been subjected to orientation treatment are arranged face to face with the orientation surface inside and with the orientation directions aligned with each other. The gap between the two-transparent substrates is kept constant by a spacer. Light-setting liquid crystal is injected into the gap, and a grating pattern is formed in the liquid crystal through exposure. As is the previous example, the line and space ratio is offset from 1/1 during the exposure, and is adjusted to an appropriate ratio so that the D/Λ ratio of the resultant diffraction grating becomes a desired value. Then, a voltage is applied to the liquid crystal externally, and the entirety of the liquid crystal is exposed to light still under he application of the voltage. Then, an unset portion of the liquid crystal is set with the molecules oriented under the application of the voltage. Thus, a polarizing diffraction grating is fabricated.

Many other known techniques may be employed to fabricate a liquid crystal polarizing diffraction grating. In such a liquid crystal polarizing diffraction grating, the difference in refractive indexes $\Delta n$ between the orientation direction of the liquid crystal and a direction perpendicular to the orientation can be set maximum of 0.2. This feature is suitable for the present invention.

Next, the operations of the polarizing diffraction grating, which is fabricated by the process shown in FIG. 13A through FIG. 13G, for example, are described below. The polarizing diffraction grating has grooves formed in a birefringent medium and filled with an isotropic medium. The isotropic medium is selected so that its index of refraction is the same as either the ordinary-ray refractive index or the extraordinary-ray refractive index of the birefringent medium. In this example, the index of refraction of the isotropic medium is set equal to the ordinary-ray refractive index of the birefringent medium.

It is assumed that linearly polarized light strikes this polarizing diffraction grating. If the incident light has a plane of polarization in compliance with the index of refraction with respect to the ordinary rays, then the incident light cannot recognize the grating because the index of refraction of the birefringent medium is set to the ordinary-ray refractive index, and because the index of refraction of the isotropic medium is equal to the ordinary-ray refractive index. Accordingly, the polarizing diffraction grating does not work with respect to this linearly polarized light with the above-described polarization plane, allowing the incident light to pass through. In contrast, if the incident light has a plane of polarization in compliance with the index of refraction with respect to the extraordinary rays, then the incident light recognizes the grating and is diffracted because the index of refraction of the birefringent medium is set to the extraordinary-ray refractive index, while the index of refraction of the isotropic medium is equal to the ordinary-ray refractive index. Thus, the diffraction efficiency can be varied depending on the direction of polarization of the incident light.

Figure 1:
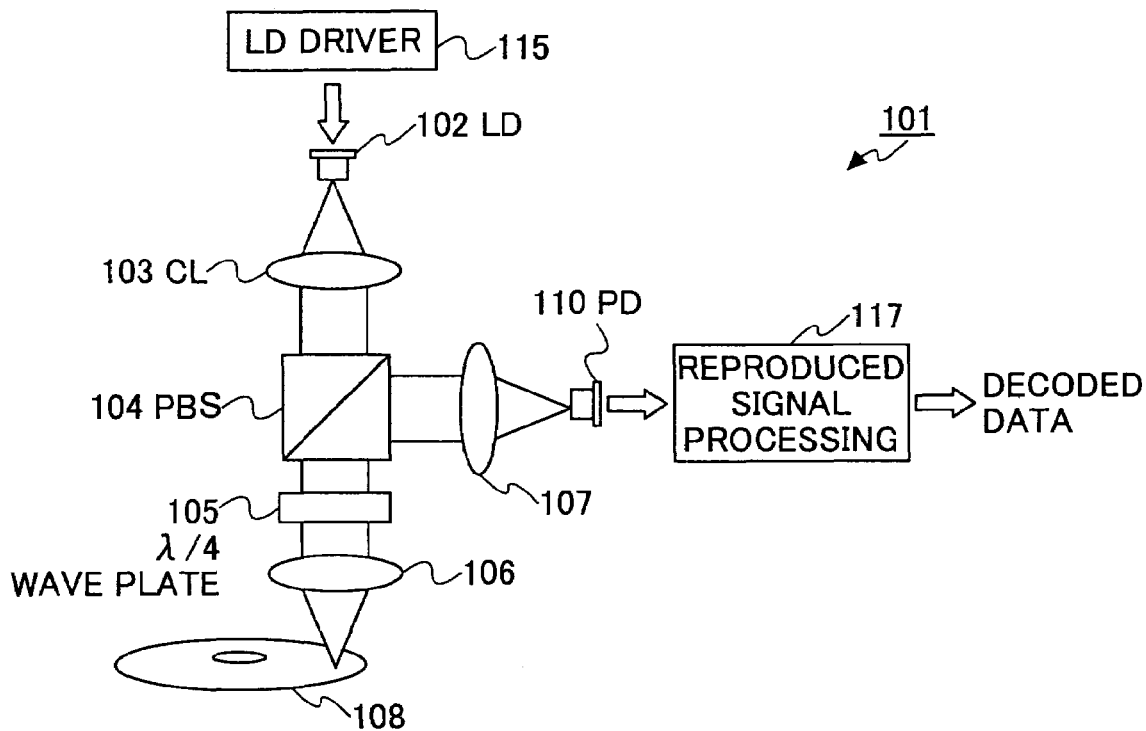
FIG. 1 schematically illustrates a conventional optical pickup for recording and reproducing information in and from an optical recording medium.
Figure 2:
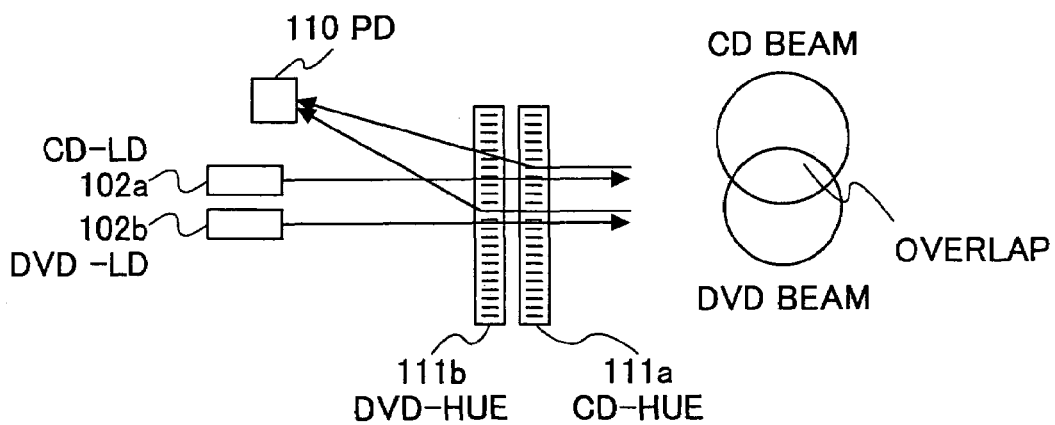
FIG. 2 schematically illustrates a two-wavelength semiconductor laser unit, in which two laser chips with different wavelengths are arranged close to each other.
Figure 3:
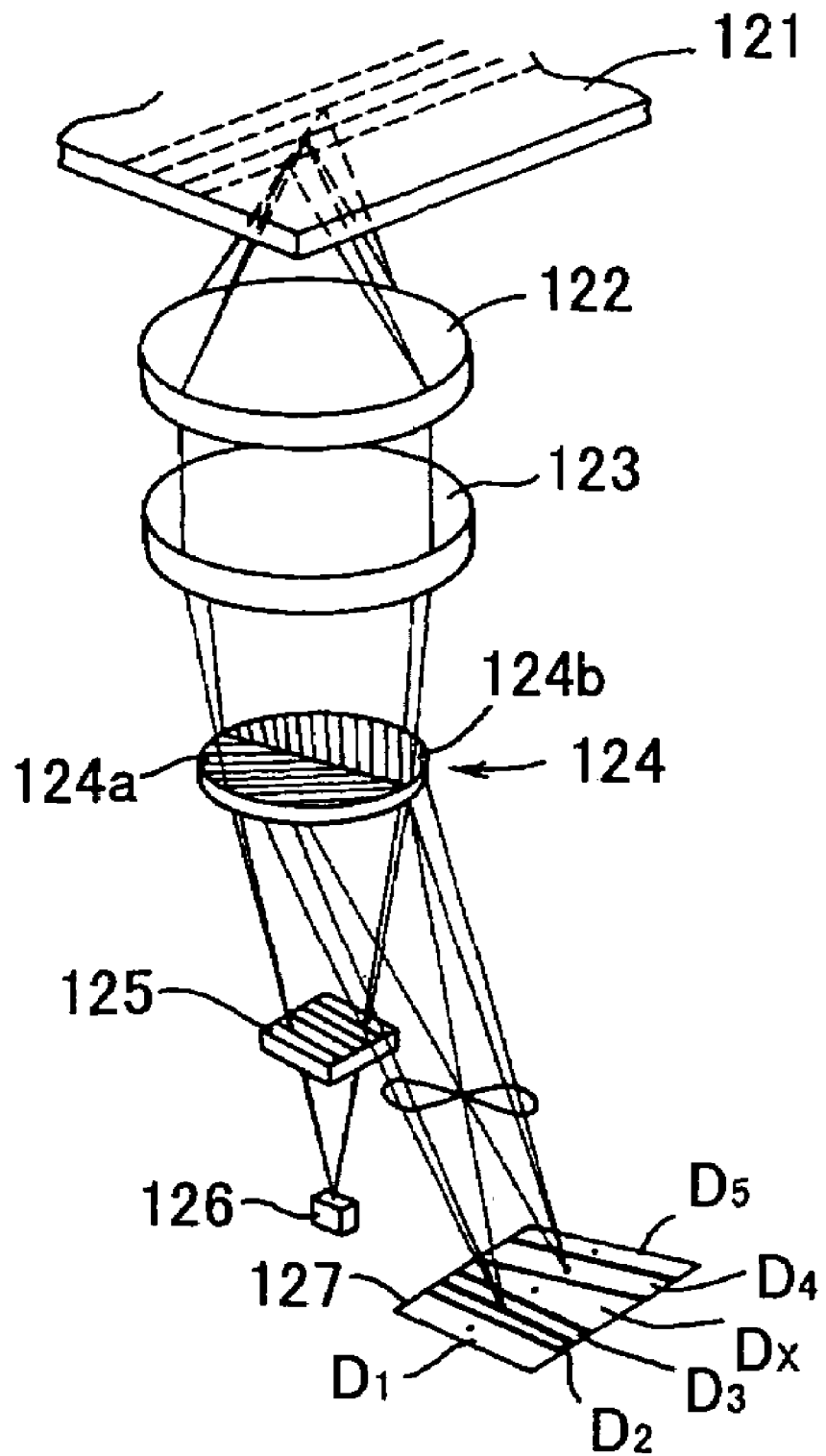
FIG. 3 illustrates another conventional optical pickup.
Figure 4:
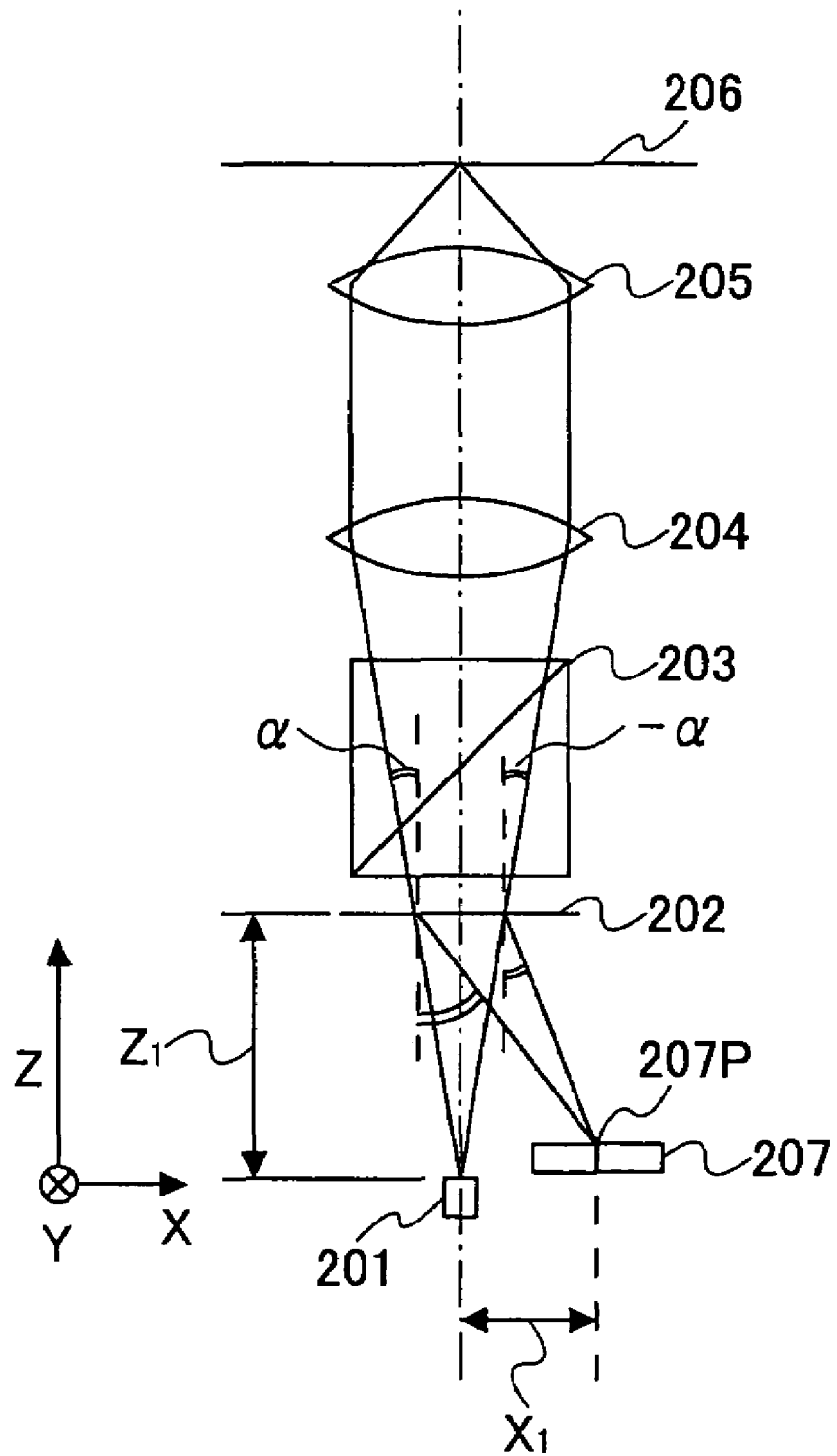
FIG. 4 illustrates still another conventional optical pickup.
Figure 5A:
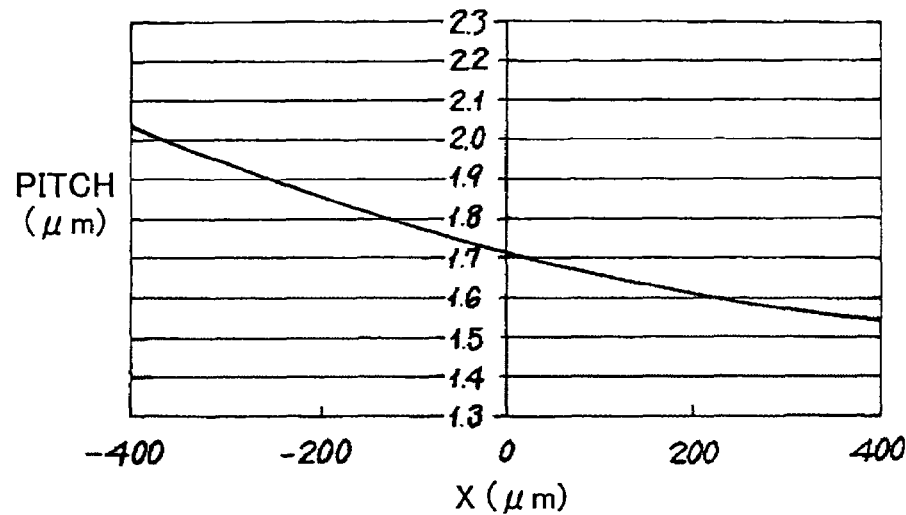
FIG. 5A and FIG. 5B are the graphs of distributions of grating pitch of a diffraction element, where in FIG. 5A the pitch is gradually decreasing in the X direction, and in FIG. 5B the pitch becomes minimum at the center and increases in the positive and negative X directions.
Figure 5B:
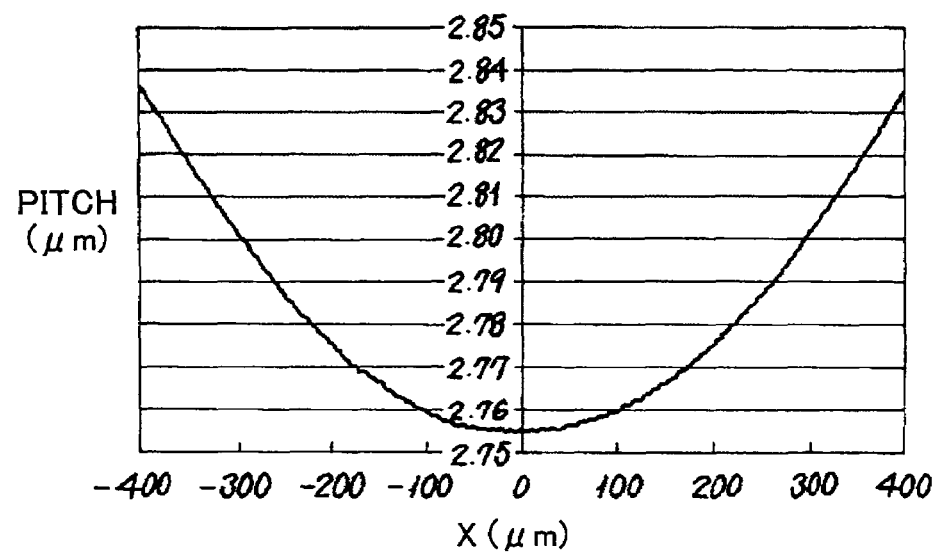
Figure 6:
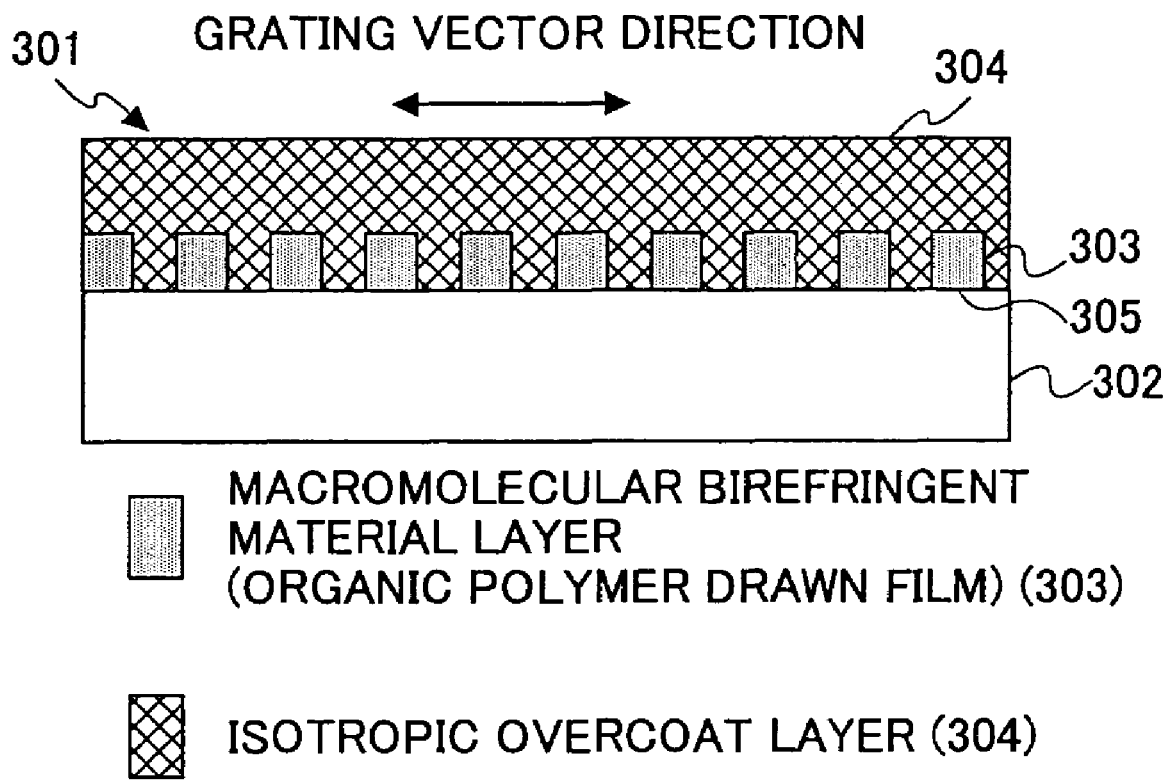
FIG. 6 illustrates a conventional polarization splitter using a diffraction grating.

The polarizing diffraction grating can be used as the DVD-HOE 11b in the optical pickup shown in FIG. 10. For the writing optical system, the illumination efficiency has to be increased because of limitations on the recording power, as explained in conjunction with FIG. 1. Accordingly, a polarizing optical system is employed for the DVD system. The light beam emitted from the DVD-LD 2b strikes the DVD-HOE 11b. Since the DVD-HOE 11b is a polarizing diffraction grating, the plane of polarization is adjusted so that the transmissivity becomes the maximum with respect to the light beam following the forward optical path. In other words, the DVD-HOE 11b functions as a transparent plate with respect to the light on the forward optical path.

The light beam having passed through the quarter-wave plate 5 is reflected from the optical recording medium 8, and passes through the quarter-wave plate 5 again. This reflected light beam is linearly polarized with the polarization plane rotated by 90 degrees, and is incident on the DVD-HOE 11b from the rear face. Since the polarization plane of the light beam on the return path has been rotated by 90 degrees, the DVD-HOE 11b functions as a diffraction grating with respect to the signal light, and it diffracts the signal light toward the photodetector (PD) 10. The DVD light beam passes through the CD-HOE 11a on both the forward path and the return path because the CD-HOE 11a is transparent with respect to the DVD light beam, as has been described above.

The optical pickup 1 shown in FIG. 10 has an LD unit 2 and a PD unit 10 on the CD/DVD common path. A laser diode 2a for CD and a laser diode 2b for DVD are arranged close to each other at a separation of 100 microns to 300 microns. The DVD laser diode 2b emits a light beam for DVD system with a wavelength of 660 nm. The DVD light beam passes through the CD-HOE 11a and the DVD-HOE 11b at a spread angle of $\theta_{DVD}$. The DVD light beam further passes through the collimating lens 3, the quarter-wave plate 5, and the object lens 6, and strikes the information recording surface of the optical recording medium 8. The DVD light beam reflected from the information recording surface of the optical recording medium 8 (which is referred to as signal light) passes through the object lens 6, the quarter-wave plate 5, and the collimating lens 3, and enters the CD-HOE 11a and the DVD-HOE 11b. On the return path, the CD-HOE 11a diffracts the CD light beams, while allowing the DVD light beam to pass through. On the contrary, the DVD-HOE 11b allows the CD light beam to pass through, while diffracting the DVD light beam. The CD light beam and the DVD light beam diffracted by the associated diffraction gratings are detected by the photodetector (PD) 10.

In the CD/DVD common path, the CD optical system is a non-polarizing optical system, while a polarizing optical system is employed for the DVD system. Accordingly, the DVD-HOE 11b is a polarizing diffraction grating, and it is required to have a zero order diffraction efficiency of 95% or higher with respect to the CD light beam on the return path. The DVD-HOE 11b is also required to have a first order diffraction efficiency of 32% or higher with respect to the DVD light beam if the DVD-writing pickup is used.

Figure 14:
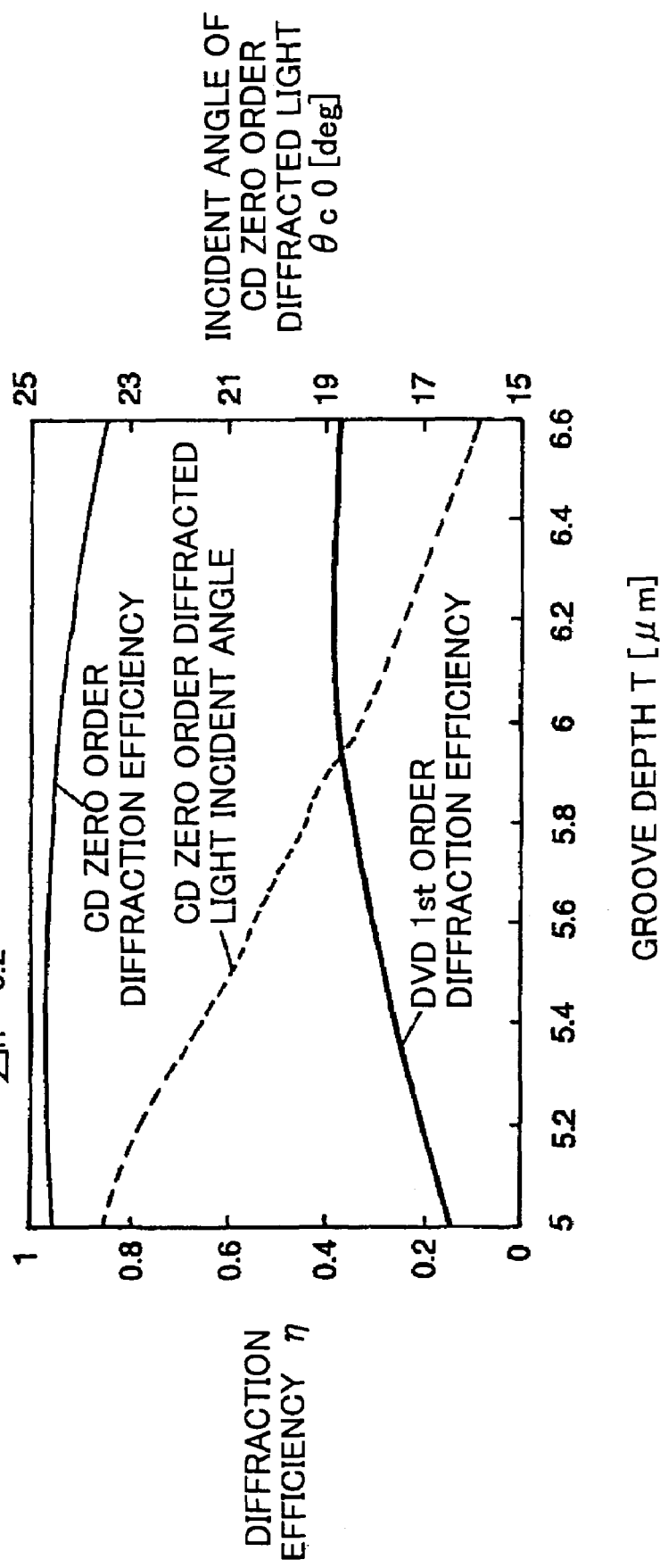
FIG. 14 is a graph of the diffraction efficiencies of the DVD-HOE shown in FIG. 10 with respect to the DVD first-order diffracted light and the CD zero-order diffracted light, as a function of the depth of the groove, taking into account the incident angle of the zero-order diffracted light.

Under these conditions, the polarizing DVD-HOE is designed using liquid crystal. The refractive index difference $\Delta n$ of the grating is 0.2 ($\Delta n=0.2$). The grating has a rectangular cross-sectional shape with a pitch $\Lambda$ of 2.0 microns ($\Lambda=2.0$ μm). The ratio D/$\Lambda$ is set to 0.26 (D/$\Lambda$=0.26). FIG. 14 is a graph showing the first order diffraction efficiency of the DVD-HOE 11b with respect to the DVD light beam (with wavelength of 0.66 microns), as well as the zero order diffraction efficiency with respect to the CD light beam (with wavelength of 0.78 microns), as a function of the groove depth T. Since the DVD-HOE allows the CD light beams to pass through, while diffracting the DVD light beam, the depth T of the groove is set to near 5.8 microns in the graph of FIG. 14. With the groove depth T of 5.8 microns (T=5.8 μm), the first order diffraction efficiency of 38% is achieved for the DVD light beam, and the zero order diffraction efficiency of 96% is achieved for the CD light beam.

Here, explanation is made for the incident angle of the zero order diffracted light beam for the CD system, with reference to FIG. 10. In the example shown in FIG. 10, the DVD-HOE 11b is placed on the light source side, and the CD-HOE 11a is placed closer to the object lens 6. Under this arrangement, the CD light beam reflected from the optical recording medium 8 is first diffracted by the CD-HOE 11a before it enters the DVD-HOE 11b on the return path. Accordingly, the CD signal light strikes the DVD-HOE 11b at an incident angle defined by the diffraction angle of the CD-HOE 11a. Since the pitch $\Lambda$ of the CD-HOE 11a is 2.4 microns in this example, the diffraction angle with respect to the CD signal light is 19 degrees. The zero order diffraction efficiency of the DVD-HOE 11b with respect to the CD signal light has to be determined taking into account the incident angle of 19 degrees. The zero order diffraction efficiency of the 96% with respect to the CD signal light shown in FIG. 14 is a value obtained taking the CD incident angle into account.

By using the diffraction grating with the ratio D/$\Lambda$ adjusted so as to be at or below 0.4 in an optical pickup device, high detection efficiency can be achieved. Consequently, an optical pickup capable of high-speed recording and reproduction can be realized.

By arranging the multi-wavelength light source, the photodetector, and the diffraction gratings for multiple wavelengths shown in FIG. 10 in a single unit, the assembling process of the optical pickup can be simplified, and the assembling time is reduced. The adjustment of the optical system can also be facilitated.

In the first embodiment, the diffraction grating is designed so that the ratio D/$\Lambda$ (the ratio of the width D of the protrusion of the grating to the pitch $\Lambda$) satisfies a prescribed condition. Such a diffraction grating is fabricated using a photo mask having a mask pattern with the bright and dark ratio adjusted so as to produce a desired value of the D/$\Lambda$ ratio. The thus fabricated diffraction grating can improve the diffraction efficiencies with respect to the zero order diffracted light and plus/minus first order diffracted light. A polarizing diffraction grating is fabricated by forming the protrusions of the grating with a birefringent medium and filling the grooves with an optically isotropic medium. This polarizing diffraction grating can vary the diffraction efficiency depending on the angle of the polarization plane of the incident light beam. Accordingly, the polarizing diffraction grating allows the light beam to pass through on the forward path, and diffracts the light beam on the return path. The diffraction grating is designed so as to transmit one of the light beams with different wavelengths λ1 and λ2, while diffracting the other light beam. This arrangement allows the light source with two wavelengths, the photodetector, and the diffraction gratings for two wavelengths to be combined into a single unit.

By using the diffraction grating in an optical pickup, high detection efficiency can be achieved, and high-speed recording and reproduction are realized. The assembling time of the optical pickup is reduced, and the adjustment of the optical system can be simplified.

SECOND EMBODIMENT

In the second embodiment, a diffraction grating with a variable pitch, but with uniform diffraction efficiency as a whole, is provided.

When the pitch of the diffraction grating varies, the diffraction efficiency also changes. This is first explained with reference to FIG. 26 through FIG. 28. The diffraction efficiency depends on both the birefringence of the birefringent material forming the diffraction grating and the depth of the groove of the grating. The birefringence of the birefringent material is represented as the difference in refractive indexes along two axes.

FIG. 26 illustrates the plus-first order diffraction efficiencies at various pitches, as a function of groove depth, using a grating with periodically arranged protrusions and grooves formed in BK7 glass. At pitches ranging from 1.6 microns to 2.0 microns, the diffraction efficiency becomes the maximum, which reaches near 40%, when the depth of the groove is 0.6 microns to 0.65 microns. However, the maximum diffraction efficiency varies depending on the pitch, as illustrated by symbols a through e in the graph of FIG. 26. At the pitch of 1.6 microns, the maximum diffraction efficiency is 39%. At the pitch of 2.0 microns, the maximum diffraction efficiency is 41%. When the groove is shallow (no deeper than 0.4 microns), there is little difference in diffraction efficiency even if the pitch changes. However, when the groove depth reaches 0.5 microns or deeper, the difference in diffraction efficiency becomes conspicuous.

Figure 27:
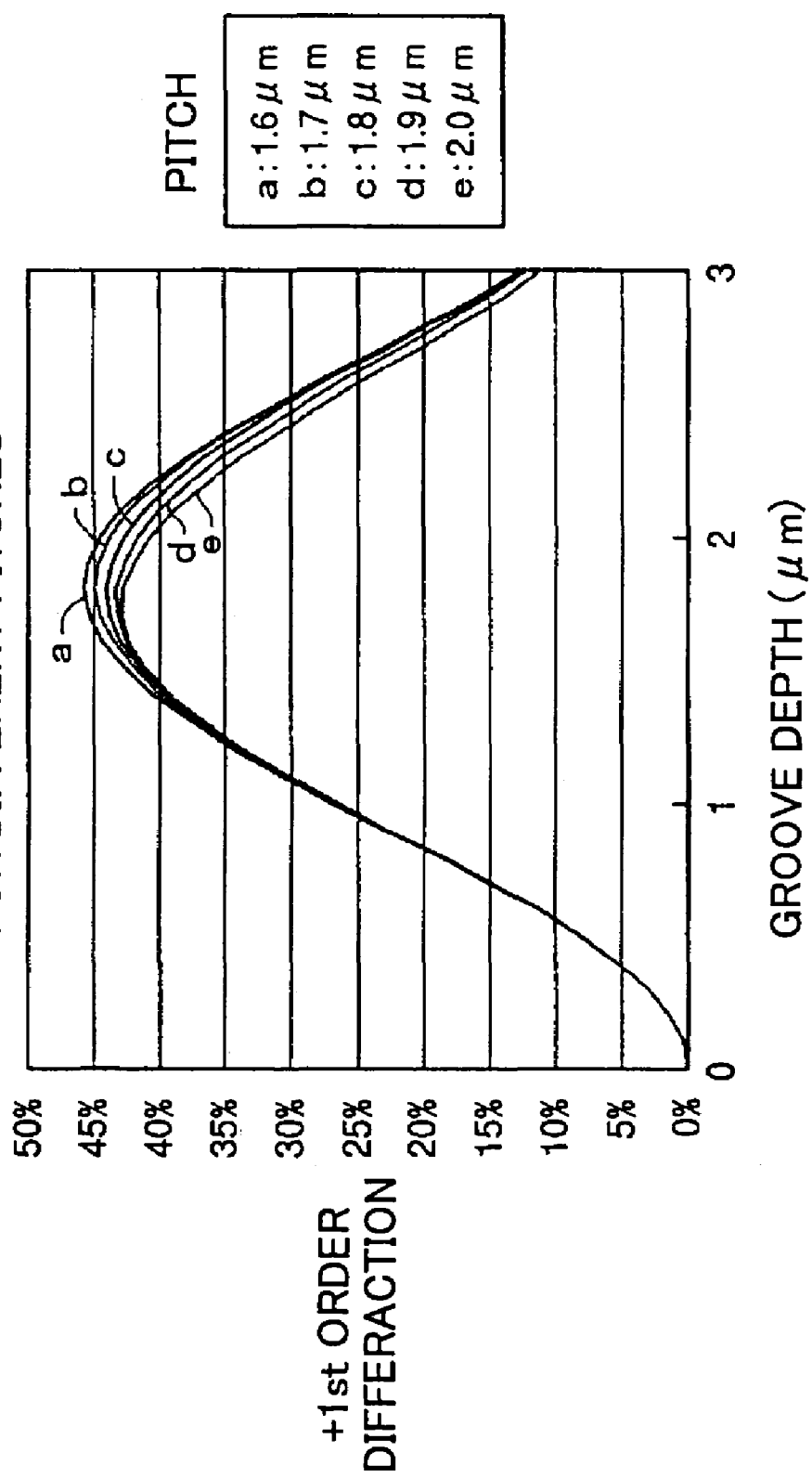
FIG. 27 is a graph showing the diffraction efficiency as a function of the depth of the groove obtained when a polarizing diffraction grating is formed at a variable pitch using liquid crystal.

FIG. 27 is a graph showing the diffraction efficiencies at various pitches, as a function of groove depth, using liquid crystal as the birefringent material forming the diffraction grating. The birefringence or difference in refractive index $\Delta n$ of liquid crystal is 0.2 ($\Delta n_B$=0.2). The diffraction efficiency of the grating made of liquid crystal becomes the maximum, which reaches about 43% to 46%, when the depth of the groove is about 1.8 microns. However, the maximum diffraction efficiency varies depending on the pitch, as illustrated by symbols a through e in the graph of FIG. 27. At the pitch of 1.6 microns, the maximum diffraction efficiency is 46%. At the pitch of 2.0 microns, the maximum diffraction efficiency is 43%. When the groove is shallow (no deeper than 1.2 microns), there is little difference in diffraction efficiency even if the pitch changes. However, when the groove depth reaches 0.5 microns or greater, the difference in diffraction efficiency becomes conspicuous.

Figure 28:
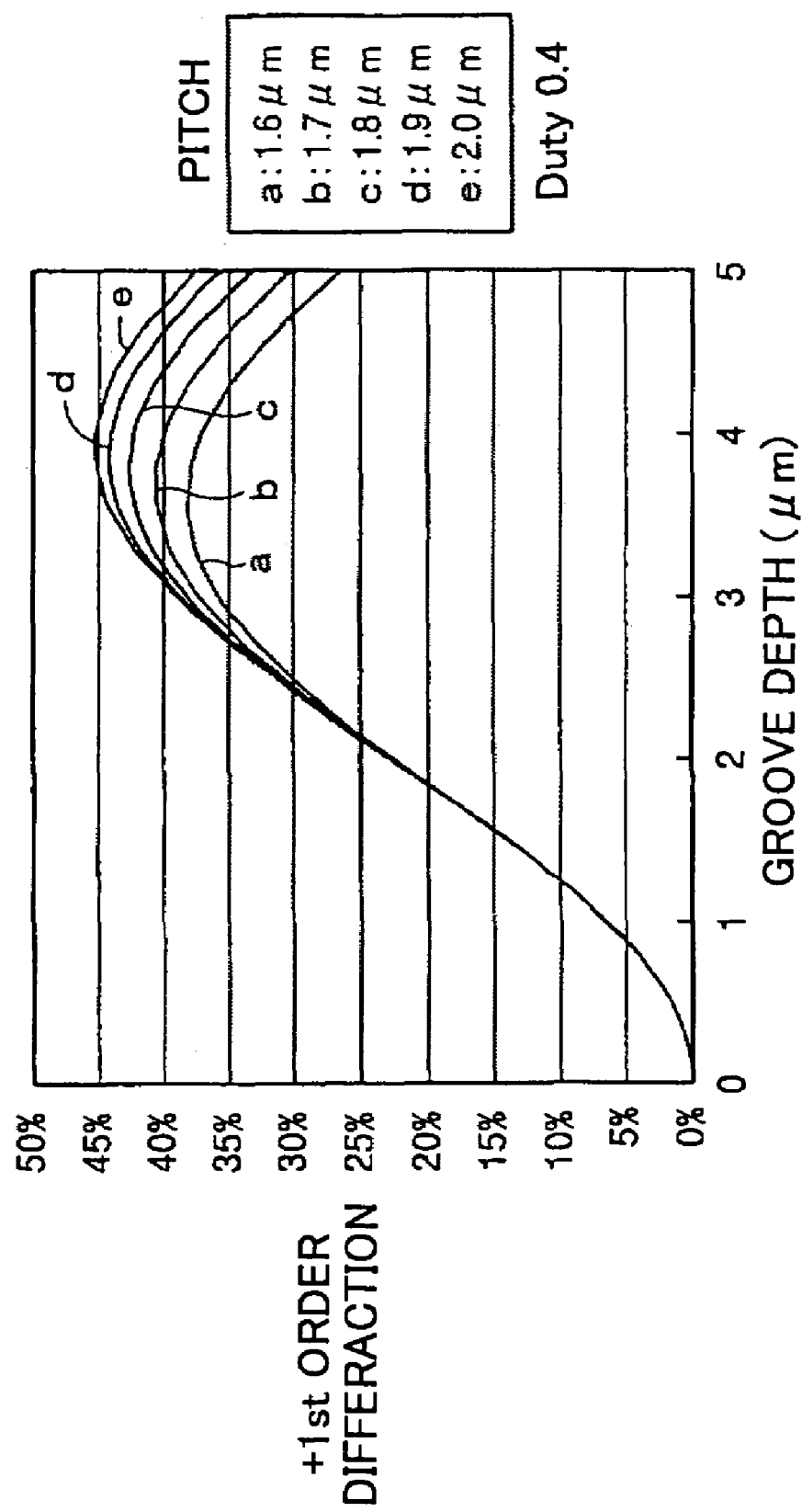
FIG. 28 is a graph showing the diffraction efficiency as a function the depth of the groove obtained when a polarizing diffraction grating is formed at a variable pitch using a drawn film of organic polymer.

FIG. 28 is a graph showing the diffraction efficiencies at various pitches, as a function of groove depth, using a drawn film of organic polymer as the birefringent material forming the diffraction grating. The birefringence $\Delta n$ of the organic polymer is 0.1 ($\Delta n$=0.1). The diffraction efficiency of the grating made of liquid crystal becomes the maximum, which reaches about 38% to 45%, when the depth of the groove is about 3.7 microns. However, the maximum diffraction efficiency varies depending on the pitch, as illustrated by symbols a through e in the graph of FIG. 28. At the pitch of 1.6 microns, the maximum diffraction efficiency is 38%. At the pitch of 2.0 microns, the maximum diffraction efficiency is 45% When using a drawn film of organic polymer as the material of the diffraction grating, the difference in maximum diffraction efficiency due to pitch difference is more conspicuous, as compared with the diffraction grating made of BK7 glass or liquid crystal. This is because the birefringence of the drawn film of organic polymer is small.

As shown in FIG. 26 through FIG. 28, the diffraction efficiency hardly varies among pitches as long as the groove of the grating is shallow. However, the diffraction efficacy varies among pitches when the groove of the grating becomes deeper. This tendency becomes more conspicuous when the birefringence of the birefringent material forming the diffraction grating is smaller.

In general, a diffraction optical element (such as a hologram) used in an optical pickup device is divided into multiple regions, and these regions have different pitches. If the diffraction efficiencies of the grating regions differ from each other, the signal output becomes uneven, and accurate signal detection cannot be carried out. Especially when the polarizing diffraction grating made of a birefringent material with small birefringence (such as a drawn film of organic polymer) is used, the diffraction efficiency varies due to pitch difference even if the groove depth is set equal over the regions.

To overcome the non-uniform signal output, a known technique may be employed to change the gain of the signal detection system to compensate for the difference in diffraction efficiency, as illustrated in FIG. 29.

In FIG. 29, when the diffraction efficiencies of the grating regions 34a and 34b of the hologram 34 differ from each other, the quantities of diffracted light incident on the associated light-receiving areas 38a and 38b of the light-receiving element 38 become different. (In this example, the light-receiving area 38a receives a larger quantity of light.) Upon incidence of light on the light-receiving element 38, electric current Ia is induced in the light-receiving area 38a that receives the light diffracted from the grating region 34a. Similarly, electric current Ib is induced in the light-receiving area 38b that receives the light diffracted from the grating region 34b. Since the light-receiving area 38a receives a larger quantity of light, electric current Ia is greater than Ib (Ia>Ib), and signal output becomes unbalanced. To overcome this, the gain resistances Ra and Rb of the amplifiers 80a and 80b of the signal detection system are set so that Rb is greater than Ra, (Rb>Ra). The difference between voltages Va and Vb input to the differential amplifier 81 becomes zero (Va−Vb=0), and the output signal representing the track signal is generated from the differential amplifier based on the zero difference.

However, the light-receiving element 38 has a noise component, which is contained in the detected signal. FIG. 30 illustrates the noise components contained in the electric signals produced by the light-receiving areas 38a and 38b, respectively.

When the gain resistances Ra and Rb of the amplifiers 80a and 80b are set so as to satisfy Rb>Ra, both the signal component and the noise component of output voltage Vb are amplified to a greater degree. On the other hand, the signal component and the noise component of output voltage Va are amplified to a smaller degree. The signal components of Va and Vb cancel each other; however, the noise components remains without being cancelled out. The difference between the amplified noise components becomes the offset of the output signal.

In conclusion, using gain control of the signal detection system is unsuitable for compensating for the difference in diffraction efficiency between two grating regions 34a and 34b because of noise components, which prevent accurate signal detection.

In the second embodiment, difference in diffraction efficiency due to pitch difference is effectively reduced by adjusting the D/Λ ratio of each grating.

Figure 15:
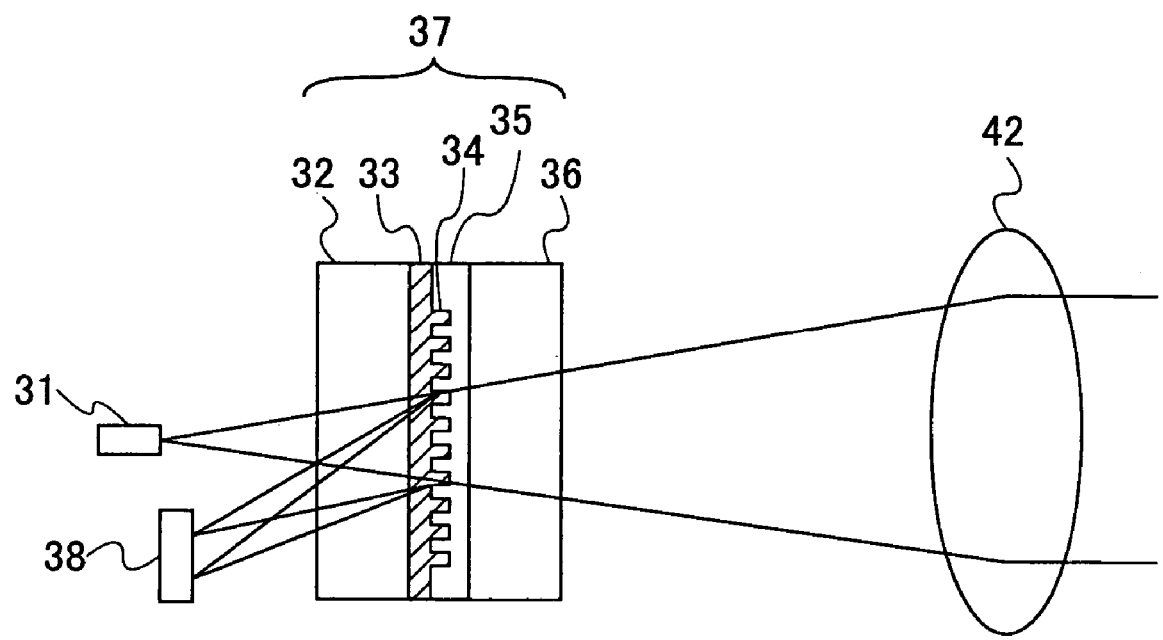
FIG. 15 illustrates the structure and the function of a diffraction optical element according to the second embodiment of the invention.
Figure 16:
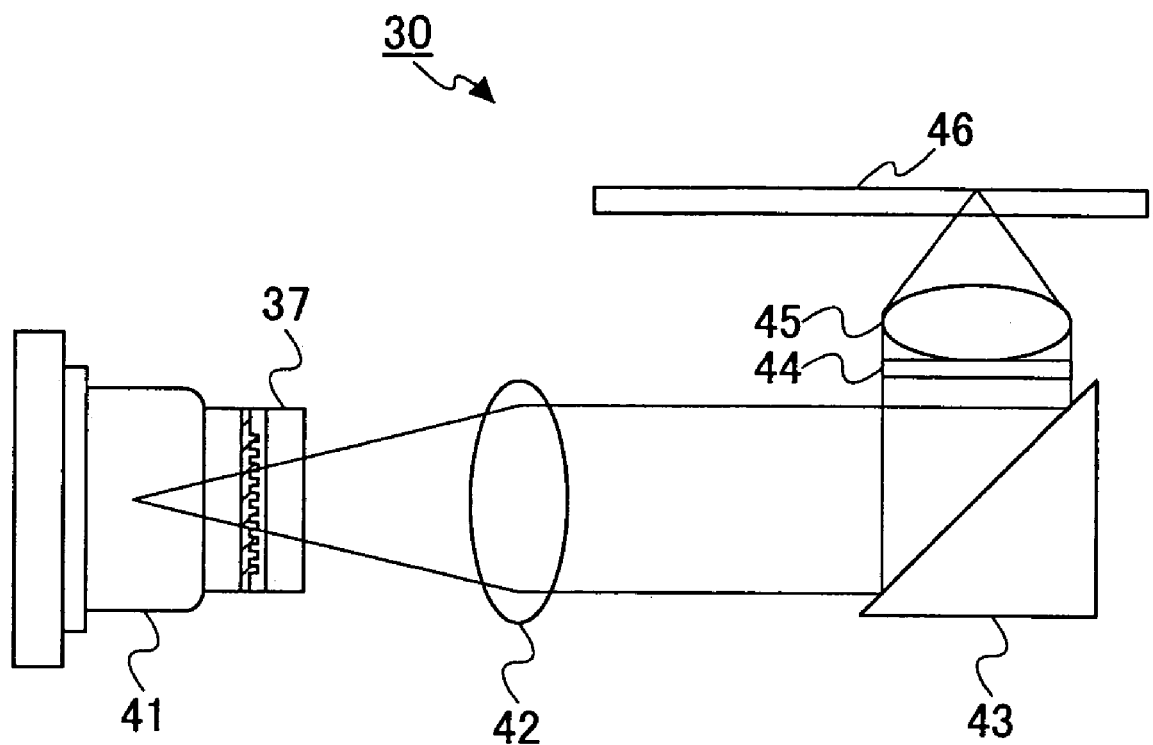
FIG. 16 illustrates an optical pickup using the diffraction optical element shown in FIG. 15 according to the second embodiment of the invention.

FIG. 15 illustrates a diffraction optical element according to the second embodiment of the invention, and FIG. 16 illustrates an optical pickup device 30 using the diffraction optical element shown in FIG. 15. The arrangement in FIG. 15 shows the detailed structure of a part of the hologram light source unit 41 of the optical pickup device 41 shown in FIG. 16. A light source 31 and a light-receiving element 38 are arranged inside the casing of the hologram light source unit 41. A diffraction optical element (hologram element) 37 is integrally provided in the light emission/incoming opening of the casing. The diffraction optical element (hologram element) 37 comprises a first transparent substrate 32, a diffraction grating (hologram) 34 with a variable pitch (or grating period) formed in an optically anisotropic and birefringent material layer 33 arranged on the first transparent substrate 32, an isotropic material layer 35 filling the grooves of the diffraction grating 34, and a second transparent substrate 36. The first and second substrates 32 and 36 are transparent glass substrates made of quartz or BK7, or transparent resin substrates. The optical pickup device 30 shown in FIG. 16 includes a coupling lens 42, a reflecting mirror 43, a quarter-wave plate 44, and an object lens 45. The light beam is guided through this optical system onto the recording medium (e.g., the optical disk) 46.

The linearly polarized light beam emitted from the light source (for example, the semiconductor laser) 31 accommodated in the hologram light source unit 41 passes through the diffraction optical element (hologram element) 37. The light beam is rendered parallel by the coupling lens 42, and is reflected by the reflecting mirror 43. The optical path is deflected vertically upward, and the light beam passes through the quarter-wave plate 44, which circularly polarizes the light beam. This circularly polarized light beam is focused as a minute light spot on the recording surface of the optical disc 46 through the object lens 45. The light beam reads the signal written on the recording surface of the optical disc 46, and is reflected from the optical disc 46. The reflected light beam is a circularly polarized light beam rotated in the opposite direction, which is then made parallel through the object lens 45. The parallel light beam is linearly polarized by the quarter-wave plate 44 in the direction perpendicular to the linear polarization direction of the forward path, and is guided toward the coupling lens 42 by the reflecting mirror 43. The light beam is then diffracted by the hologram 34 of the diffraction optical element (hologram element 37. The diffracted light beam is received by the light-receiving element 38, which detects the signal read from the optical disc.

EXAMPLE 1

Next, the hologram 34 of the diffraction optical element (hologram element) 37 is explained. The hologram 34 is a polarizing hologram, which is formed as a grating comprised of alternately arranged protrusions and grooves at a variable pitch in the optically anisotropic and birefringent material layer (hereinafter, simply referred to as the "birefringent material layer") 33. The grooves of the grating are filled with the isotropic material 35. The hologram 34 is divided into, for example, two grating regions 34a and 34b, as illustrated in FIG. 17A. The pitch (or the period) of the grating region 34a differs from that of the grating region 34b. Accordingly, the light beams incident on the hologram 34 are diffracted from the diffraction regions 34a and 34b at different diffraction angles, and the diffracted light beams are detected by the light receiving area 38a and 38b, respectively. In the example shown in FIG. 17A, the diffraction angle of the grating region 34a is smaller than that of the grating regions 34b, and therefore, the pitch of the grating region 34a is greater than that of the grating region 34b. The pitch of the grating region 34a is set to 2.0 microns, and the pitch of the grating region 34b is set to 1.6 microns in this example.

When the pitches of the grating regions of the hologram 34 differ from each other, the maximum diffraction efficiency varies between the grating regions, as has been explained above in conjunction with FIG. 26 through FIG. 28. In order to carry out high-speed reproduction in the optical pickup device, the diffraction efficiency of the hologram 34 has to be raised to increase the light quantity detected at the light-receiving element 38. When increasing the diffraction efficiency, the quantities of light diffracted from the grating areas 34a and 34b with different pitches and detected at the light-receiving areas 38a and 38b, respectively, of the light-receiving element 38 differ from each other because the maximum diffraction efficiency varies due to the pitch difference. The signal outputs from the light-receiving areas 38a and 38b become unbalanced, and accurate signal detection cannot be carried out.

To overcome this problem, the ratio D/Λ (the ratio of the width of the protrusion of the grating to the pitch of the grating) of the grating is adjusted in each of the grating regions with different pitches so that the diffraction efficiencies become substantially uniform between the regions. This D/Λ ratio is referred to as the "duty".

In Example 1 shown in FIG. 17B, the duty of the grating region 34b with a smaller pitch is set smaller that that of the grating region 34a with a greater pitch, in accordance with the birefringence of the birefringent material forming the grating. With the birefringent material having birefringence of 0.1, the duty of the grating region 34a with the pitch of 2.0 microns is set larger than that of the grating region 34b with the pitch of 1.6 microns.

Figure 18:
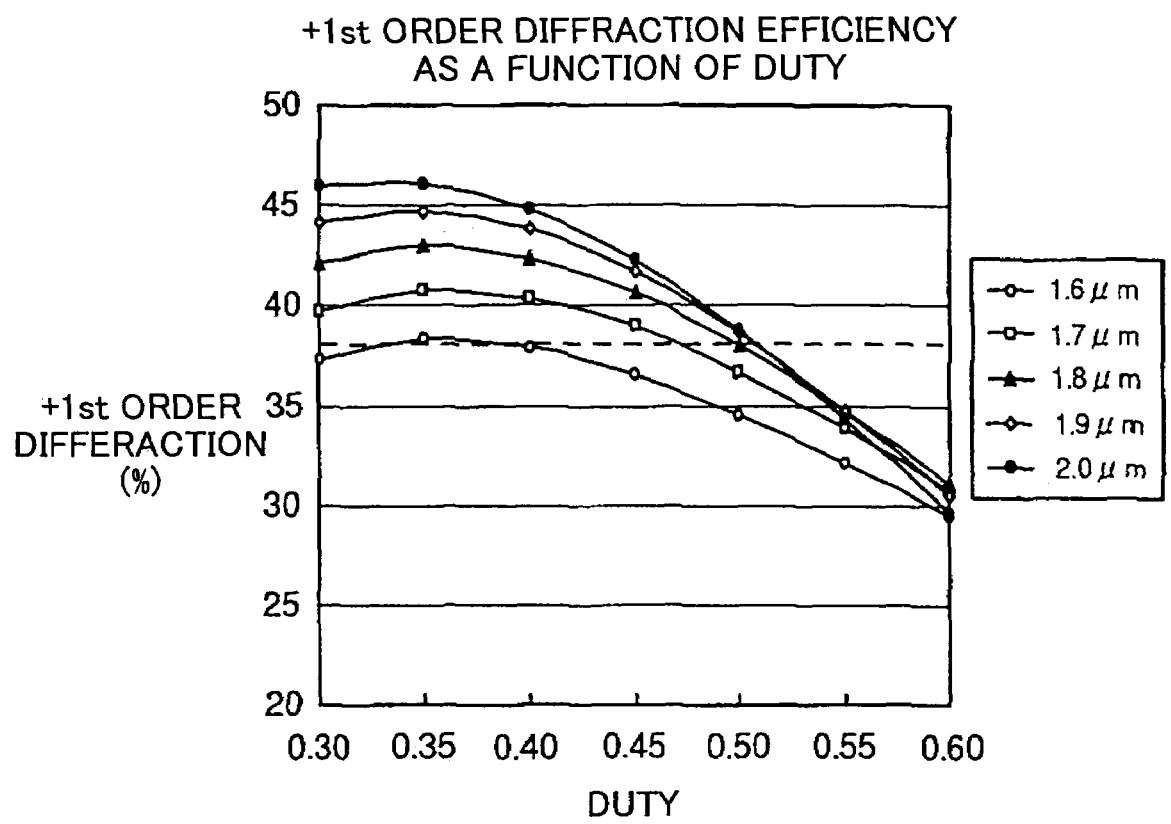
FIG. 18 is a graph showing the plus-first order diffraction efficiency as a function of duty when the refractive index of the birefringent material is 0.1.

FIG. 18 is a graph showing the plus-first order diffraction efficiencies at various pitches as a function of the duty when the birefringence of the birefringent material is 0.1. In the grating region 34b of the hologram 34, the pitch is 1.6 microns, and the diffraction efficiency of 38% is obtained when the duty of the grating is set to 0.4. In the grating region 34a of the hologram 34, the pitch is 2.0 microns, and the diffraction efficiency of 45% is obtained at duty of 0.4. In this state, the diffraction efficiencies of the grating regions 34a and 34b differ from each other. However, by setting the duty of the grating region 34a with 2.0-micron pitch to 0.5, the diffraction efficiency becomes about 38%, which is almost equal to that of the grating region 34b with 1.6-micron pitch. Making use of the fact that the difference in duty affects the diffraction efficiency, the duty of the grating region with a smaller pitch is set small so as to obtain high diffraction efficiency, and the duty of the grating region with a greater pitch is set large so as to make the diffraction efficiency consistent with that of the other grating region with the smaller pitch. In this manner, the diffraction efficiencies of the gratings with different pitches can be set equal. Consequently, the light quantities detected at the light-receiving areas 38a and 38b of the light-receiving element 38 become equal, and accurate signal detection can be carried out based on the well-balance signal outputs.

Figure 19A:
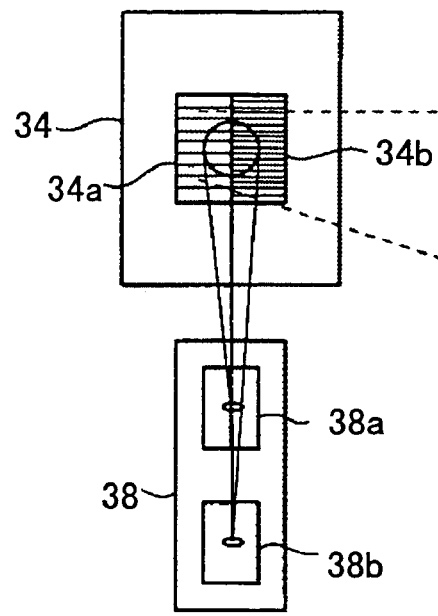
FIG. 19A and FIG. 19B illustrate another example of the relation between the grating pitch and the duty of the hologram of the diffraction optical element shown in FIG. 15.
Figure 19B:
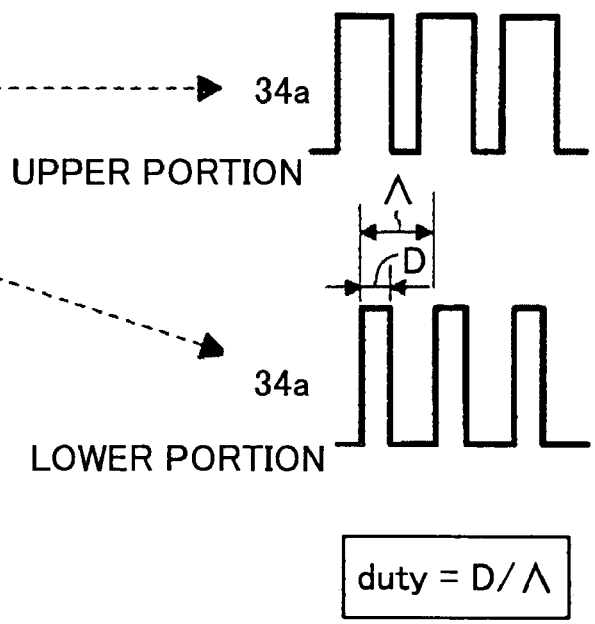

In FIG. 17A, the pitch of each of the grating regions 34a and 34b appears to be constant in the region. However, in the actual design, the pitch may be variable in each of the grating regions 34a and 34b. For instance, when the hologram 4 is provided with a lens function to carry out focus detection using the beam size method, there are sub-regions with a larger pitch and a smaller pitch existing in each of the grating regions 34a and 34b. FIG. 19A and FIG. 19B illustrate an example of the hologram 34 with multiple grating regions, at least one of the grating regions having a variable pitch. In the example shown in FIG. 19A and FIG. 19B, the grating formed in the grating region 34a comprises an upper grating part and a lower grating part with different pitches, as illustrated in FIG. 19B. When the birefringence of the birefringent material is 0.1, the duty of the grating part with a smaller pitch is set small, and the duty of the grating part with a greater pitch is set large to make the diffraction efficiencies of the grating parts consistent with each other. Accordingly, uniform diffraction efficiency can be achieved throughout the grating region 34a.

In the first example shown in FIG. 17 through FIG. 19, the birefringence or difference in refractive index of the birefringent material forming the hologram 34 is 0.1. If the birefringence varies, the characteristics of the diffraction grating change. Next example illustrates the characteristics of the diffraction grating with birefringence of 0.2.

EXAMPLE 2

Figure 20:
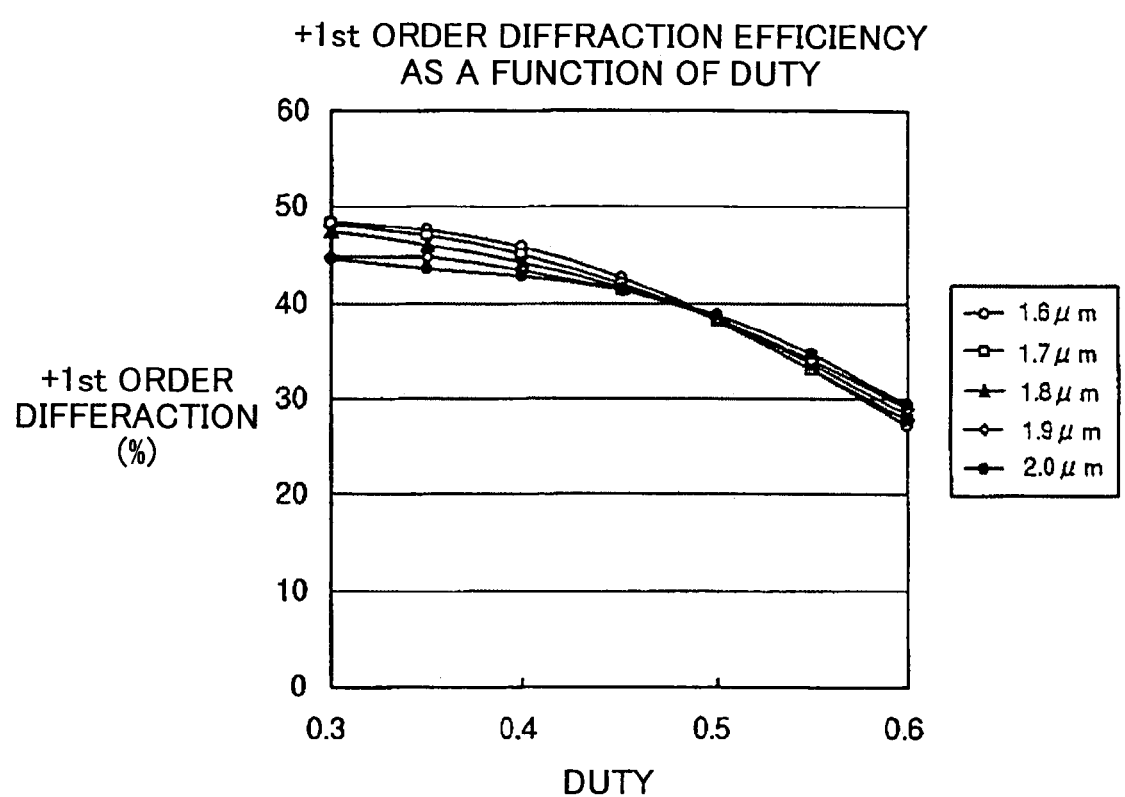
FIG. 20 is a graph showing the plus-first order diffraction efficiency as a function of duty when the refractive index of the birefringent material is 0.2.

FIG. 20 is a graph showing the plus-first order diffraction efficiencies at various pitches as a function of the duty when the birefringence of the birefringent material is 0.2. With birefringence of 0.2, the grating with a smaller pitch exhibits higher diffraction efficiency. For example, when the duty is 0.4, the grating with a pitch of 1.6 microns exhibits the maximum diffraction efficiency of 46%, while the maximum diffraction efficiency of the grating with a pitch of 2.0 microns is 43%. Therefore, when the birefringent material with birefringence of 0.2 is used, the duty of the narrow pitch grating is set greater than that of the wide pitch grating. For instance, the duty of the 2.0-micron pitch grating is maintained at 0.4, and the duty of the 1.6-micron pitch grating is set to 0.45. By adjusting the duty of the 1.6-micron pitch grating, its diffraction efficiency becomes 43%, which is equal to that of the 2.0-micron pitch grating with duty of 0.4. This means that even if different birefringent materials are used to form the grating, the diffraction efficiency of the variable-pitch hologram 34 can be made uniform as a whole simply by adjusting the duties of the respective grating parts with different pitches.

In Example 1 and Example 2, the duty is adjusted according to the pitch. To fabricate a diffraction optical element comprising the hologram 34 with variable pitch, a mask having a grating pattern with the duty variably adjusted according to the pitches is used. A birefringent material is etched using the mask to form a grating comprised of alternately arranged protrusions and grooves at variable duty. Then, an isotropic material is used to fill in the grooves of the grating so as to cover at least the grooves of the grating.

To be more precise, when fabricating the diffraction optical element 37 shown in FIG. 15, a birefringent material layer 33 is provided onto the first transparent substrate 32. For example, a drawn film of organic polymer is bonded to the first substrate 32. Then, photosensitive resin (photoresist) is applied onto the birefringent material layer 33 by spin coating. The photoresist is exposed to light through a photo mask having a grating pattern with variable duty in accordance with the pitches. After the exposure of the mask pattern, the photoresist is developed into the pattern defining the grating.

Then, the birefringent material layer 33 is processed by dry etching using the photoresist pattern as the etching mask. The photoresist mask is removed by solvent or gas ashing, and the diffraction grating (hologram) 34 comprised of alternately arranged protrusions and grooves is left. Since the grating pattern formed in the photo mask is transferred to the diffraction grating (hologram) 34, the diffraction grating 34 has a variable duty having been adjusted in accordance with the variable pitch. The diffraction grating 34 is covered with an isotropic material (e.g., an optically isotropic resin) layer 35 so that at least the grooves of the grating are filled with the isotropic material. Then, the second transparent substrate 36 is placed onto the isotropic material layer 35. Then the resin is cured by applying ultraviolet rays or heat to fix the second transparent substrate 36 onto the isotropic material layer 35. In this manner, the diffraction optical element 37 including the hologram (or the diffraction grating) 34 with variable duty according to variable pitch can be fabricated.

EXAMPLE 3

Figure 21:
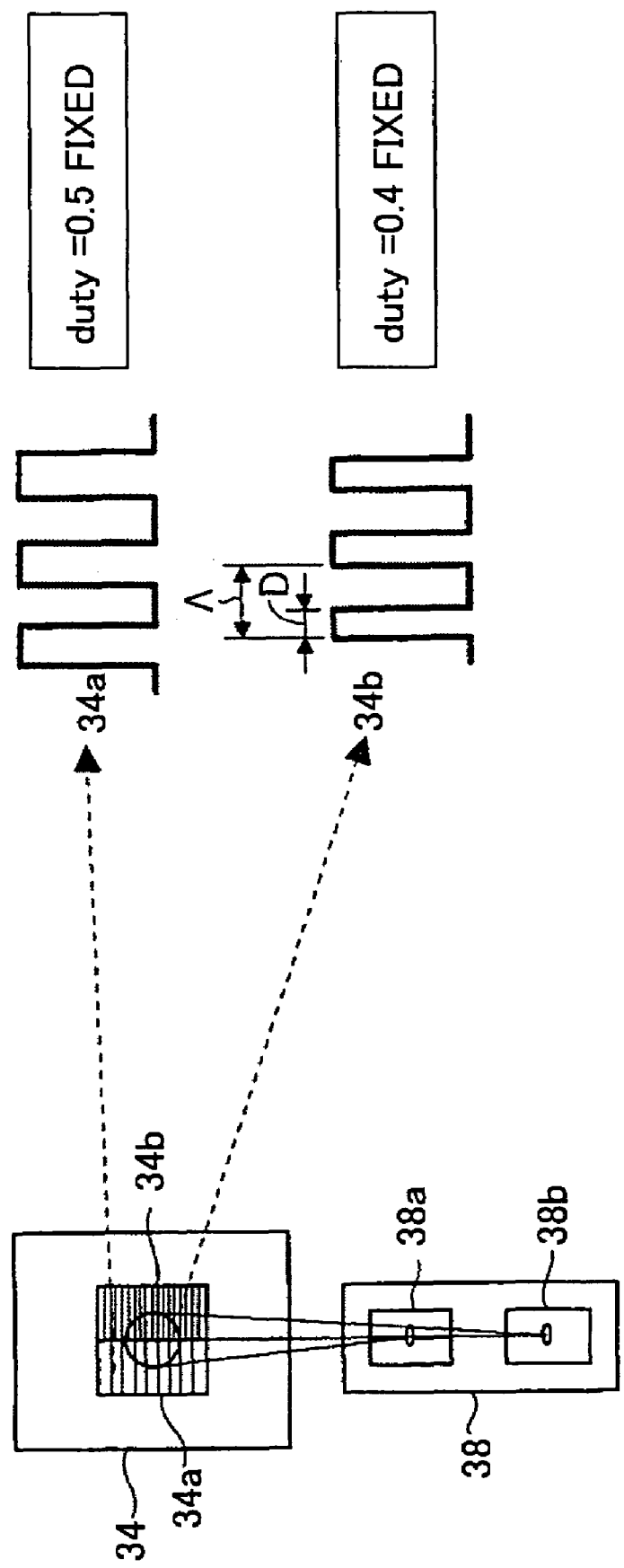
FIG. 21A and FIG. 21B illustrate still another example of the relation between the grating pitch and the duty of the hologram of the diffraction optical element shown in FIG. 15.

In Examples 1 and 2, the duty is adjusted according to the pitch of the grating. In Example 3, the duty is set for each of the grating regions, each region having a fixed pitch. Unlike the example shown in FIG. 19A and FIG. 19B where each grating region has a variable pitch, the pitch of each of the grating regions may be fixed when focus detection is carried out using the knife edge, method. In this case, different duties are set for the associated grating regions, as illustrated in FIG. 21A and FIG. 21B. The duty is determined for each of the grating regions 34a and 34b so that the diffraction efficiencies of these grating regions are consistent with each other. Since duty is determined for each of the grating regions, the extent of variation in duty is small. Accordingly, the amount of data required to design the masks (photo mask and the etching mask) for fabricating the diffraction optical element can be reduced. The mask designing time and the mask manufacturing cost are also reduced.

As in Examples 1 and 2, when birefringence of the birefringent material is 0.1, the duty of the grating region with the smallest pitch is set smaller than any other grating region. The duty of the grating region with a greater pitch is set greater.

When the birefringence of the birefringent material is 0.2, the duty of the grating region with the smallest pitch is set greater than any other grating region, and the duty of the grating region with a greater pitch is set smaller.

In this manner, the duty of the grating region with the smallest pitch is set smaller or greater than any other grating region, depending on the birefringence of the birefringent material layer forming the diffraction grating. By doing so, the diffraction efficiencies can be made uniform between grating regions with different pitches, while the diffraction efficiency is maintained high as a whole.

To fabricate the diffraction optical element comprising the hologram 34 divided into multiple grating regions, each grating region having a different pitch, a mask having a grating pattern with the duty varied for each of the grating regions is used. A grating of each of the grating regions has periodically arranged protrusions and grooves at a prescribed duty. This grating is formed in a birefringent material layer by etching using the above-described mask. Then, an isotropic material is used to fill in the grooves of the grating so as to cover at least the grooves of the grating.

Using the example of the diffraction optical element 37 shown in FIG. 15, the photomask pattern with a different duty and a different pitch for each of the grating regions is transferred onto the photoresist through the exposure and development processes. The birefringent material layer 33 is etched using the photoresist mask, and the hologram 34 consisting of multiple grating regions with different duties is formed. The hologram 34 is covered with an isotropic material (e.g., an optically isotropic resin) layer 35 so that at least the grooves of the grating are filled with the isotropic material. Then, the second transparent substrate 36 is placed onto the isotropic material layer 35. Then the resin is cured by applying ultraviolet rays or heat to fix the second transparent substrate 36 onto the isotropic material layer 35. In this manner, the diffraction optical element 37 including the hologram (or the diffraction grating) 34 that is divided into multiple grating regions, each region having a different duty in accordance with the associated pitch, can be fabricated.

EXAMPLE 4

In Example 4, the structure and the materials used in the hologram 37 are explained with reference to FIG. 22.

Figure 22:
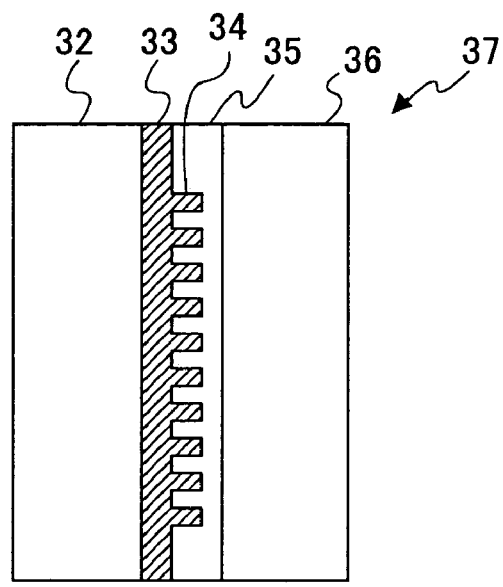
FIG. 22 illustrates an example of the structure of the diffraction optical element.

As shown in FIG. 22, the diffraction optical element 37 is a polarizing diffraction element having a grating or hologram 34 with protrusions and grooves formed in the birefringent material layer 33. The first and second substrates 32 and 36 are transparent glass plates made of quartz or BK7. The first and second substrates 32 and 36 may be transparent resin plates. The grooves of the hologram 34 are filled with isotropic material, and this polarizing hologram 34 is covered with the isotropic material layer 35. The diffraction efficiency is determined by the difference between the birefringence of the birefringent material 33 and the refractive index of the isotropic material 35, and by the depth of the groove. The maximum diffraction efficiency varies due to pitch difference, and the variation in diffraction efficiency differs depending on the refractive index difference, as has been explained in conjunction with FIG. 26 through FIG. 28. Since the characteristics of the grating vary depending on the refractive index difference, the optimum duty of the grating has to be determined.

For example, if liquid crystal is used as the birefringent material 33, as in FIG. 27, the birefringence is large, and therefore, variation in the maximum diffraction efficiency due to pitch difference is small. Accordingly, the range for adjusting the duty is also small. On the other hand, if a drawn film of organic polymer is used as the birefringent material 33, as in FIG. 28, the birefringence is small, and therefore, variation in the maximum diffraction efficiency due to pitch difference become large. Accordingly, it is necessary to adjust the duty in a wider range to make the diffraction efficiency uniform over the grating. Regardless of the type (or the birefringence) of the birefringent material 33, the diffraction efficiency can be made uniform by varying the duty in accordance with the pitch making the diffraction efficiency uniform through adjustment of the duty is useful means suitably applied to a variety of birefringent materials.

An example of the birefringent material 33 used in the diffraction optical element 37 is an organic oriented film. To form organic oriented film, a surface-oriented layer is prepared by applying SiO onto a glass substrate by oblique evaporation, or by rubbing an organic layer, such as a polyethylene terephthalate (PET) layer, with a piece of cloth. Then, polydiacethylene monomer is applied onto the surface-oriented layer by vacuum evaporation, which is oriented along the molecule orientation of the surface-oriented layer. The polydiacethylene monomer is then polymerized through irradiation of ultraviolet rays, and an optically anisotropic (birefringent) film is obtained. See J. Appl. Phys., Vol. 72, No. 3, at 939 (1992). With this method, a birefringent film made of an organic material is produced at low cost.

Another example of the birefringent material is a drawn film of an organic polymer. To fabricate drawn film of organic polymer, a macromolecular film, such as polyamide film or polycarbonate film formed by spin coating, is drawn in a direction to orient the molecular chain along one axis to produce in-plane birefringence. The birefringence (or difference in refractive index) $\Delta n$ of the drawn film of an organic polymer can be adjusted by changing the temperature or the force applied during the drawing process. This is an inexpensive and mass-production method. Examples of organic polymer used for the drawn film include polyamide, polycarbonate, poly(vinyl alcohol), poly(methyl methacrylate), polystyrene, polysulfone, and polyether sulfone.

By forming a grating or grating regions in the macromolecular oriented film or the drawn film of organic polymer by photolithography using a mask, and by covering the grating with an isotropic material 35 with a flat surface, a low-cost and high-efficiency polarizing hologram can be obtained.

If the grating is formed in the organic polymer with a fixed duty, the diffraction efficiency is substantially uniform up to 30% regardless of the pitch as long as the groove depth is at or less than 2.5 microns, as shown in FIG. 28. If the groove is made deeper than 2.5 microns, uniform diffraction efficiency cannot be achieved by the conventional techniques. However, by changing the duty according to the pitch of the grating, the diffraction efficiency of 38% can be achieved, as has been explained in Example 1. This means that the diffraction efficiency is improved by 30%.

EXAMPLE 5

Figure 23:
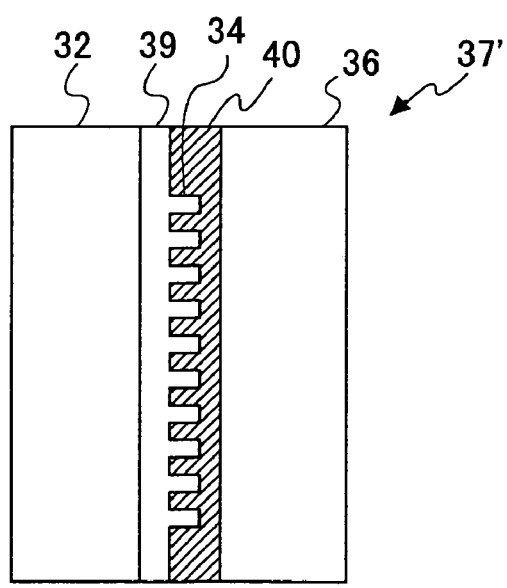
FIG. 23 illustrates another example of the structure of the diffraction optical element.

FIG. 23 illustrates a modification of the diffraction optical element. A polarizing diffraction optical element 37' has a grating 34 with variable pitch or grating regions with different pitches formed in an optically isotropic material layer 39. In this case, the grooves of the grating 34 are filled with an optical anisotropic material with birefringence. The relation between the pitch and the duty of the grating is the same as that described in Examples 1–3.

The first and second substrates 32 and 36 are transparent glass plates made of quartz or BK7. The first and second substrates 32 and 36 may be transparent resin plates. The isotropic material 39 may be the same as the first substrate 32.

The grooves of the hologram 34 are formed in the isotropic material layer 39 by photolithography using a mask, and filled with an optically anisotropic birefringent material 40. The diffraction efficiency of the polarizing hologram 34 is determined by the birefringence of the birefringent material 40 and groove depth of the grating (or hologram) 34. As in the example shown in FIG. 22, the maximum diffraction efficiency varies due to pitch difference, depending on the birefringence of the birefringent material 40, as has been explained in conjunction with FIG. 26 through FIG. 28. Since the characteristics of the grating vary depending on the birefringence, the optimum duty of the grating has to be selected taking the birefringence into account.

For example, if liquid crystal is used as the birefringent material 40, as in FIG. 27, the birefringence is large, and therefore, variation in the maximum diffraction efficiency due to pitch difference is small. Accordingly, the range for adjusting the duty is also small. On the other hand, if an organic polymer is used as the birefringent material 40, as in FIG. 28, the birefringence is small, and therefore, variation in the maximum diffraction efficiency due to pitch difference become large. Accordingly, it is necessary to adjust the duty in a wider range to make the diffraction efficiency uniform over the grating. Regardless of the type (or the birefringence) of the birefringent material 40, the diffraction efficiency can be made uniform by varying the duty in accordance with the pitch. Accordingly, the diffraction optical element 37', in which the grating is formed in the optically isotropic material and the grooves are filled with a birefringent material, can achieve the same effect for making the diffraction efficiency uniform throughout the grating by adjusting the duty.

Liquid crystal is suitably used as the birefringent material 40 of the diffraction optical element 37' shown in FIG. 23. When the grating is formed in the isotropic material 39, the grooves of the grating are filled with liquid crystal. The birefringence of liquid crystal can be changed to a certain extent by adjusting the composition. If the groove formed in the isotropic material 39 is shallow, the birefringence of liquid crystal is set large. If deep groove processing is possible, the birefringence of liquid crystal is set small. For example, when fabricating a bulk hologram, deep grooves are formed in the isotropic material 39, while using liquid crystal with small birefringence. In this manner, liquid crystal is adaptable to a wide variety of holograms, selecting appropriate birefringence. By varying the pitch and the duty of the grating of each of the grating regions depending on the birefringence, uniform and high diffraction efficiency can be achieved.

To fabricate the diffraction optical element 37' shown in FIG. 23, a grating is formed in the isotropic material 39 by photolithography using a mask having a grating pattern with the duty variably adjusted according to the pitches of the grating or grating regions.

First, an isotropic material layer 39 is applied or bonded onto the first transparent substrate 32. The isotropic material layer 39 may be in common with the material of the first transparent substrate 32. A photoresist (not shown in FIG. 23) is applied onto the isotropic material layer 39 by spin coating. Then, the photoresist is exposed to light through a photo mask having a grating pattern with the duty variably adjusted for each of the grating regions in order to transfer the mask pattern onto the photoresist. The photoresist is developed and the resist pattern defining the grating is formed. The isotropic material layer 39 is processed by dry etching using the photoresist pattern as the etching mask. The photoresist is then removed by solvent or gas ashing. The diffraction grating (or hologram) 34 is formed in the isotropic material layer 39. Since the photo mask pattern is transferred to the grating, the duty of the grating 34 is adjusted so as to vary according to the pitch of each of the grating regions. The periphery of the first transparent substrate 32 on which the hologram 34 is formed is surrounded by a sealing member, and the second substrate 36 is placed over the first substrate 32 via the sealing member. Finally, a birefringent material (for example, liquid crystal) 40 is injected into the gap between the isotropic material layer 39 and the second substrate 36 so as to fill the grooves of the hologram 34 with the birefringent material 40. Then, the diffraction optical element 37 having the hologram 34 with variable duty is completed.

EXAMPLE 6

FIG. 16 illustrates an optical pickup device 30 according to an embodiment of the invention. The optical pickup device 30 comprises a hologram light source unit 41, a coupling lens 42, a reflecting mirror 43, a quarter-wave plate 44, and an object lens 45. A light source 31 and a light-receiving element 38 are accommodated in the casing of the hologram light unit 31. A diffraction optical element (hologram element) 37 is provided integrally to the light emission/incoming opening of the casing. Any one the polarizing diffraction gratings explained in Examples 1 through 5 may be used for the diffraction optical element 37. The optical pickup device 30 has the advantages listed below.

(1) Since the diffraction efficiency is uniform over multiple grating parts or grating regions with different pitches, well-balanced signal output is obtained, and a tracking signal can be detected accurately.
(2) Not only is the diffraction efficiency uniform as a whole, but also high diffraction efficiency is achieved over the grating (or grating regions) Accordingly, high-speed recording and reproduction is carried out.
(3) Since the diffraction efficiency is made uniform simply by adjusting the duty, the existing fabrication process can be utilized by replacing the photo mask with a new one having a grating pattern with adjusted duty. Accordingly, the hologram element and the optical pickup device can be manufactured at low cost.
(4) Since the diffraction efficiency can be made uniform regardless of the pitch of the grating, the configuration and arrangement of the light-receiving element 38 inside the hologram light source unit 31 can be simplified. Accordingly, the degree of freedom in design is increased.
The optical pickup device 30 has a hologram with high and uniform diffraction efficiency, and reliability of signal detection is improved based on the high efficiency of light utilization. With the high diffraction efficiency, the gain of the optical integrated circuit (OPIC) of the signal detection system can be reduced, contributing to the high-response ability of the OPIC. By installing this optical pickup device in an optical disk drive, high-speed recording and reproduction can be realized.

In addition, polarizing hologram element 37 is used for light splitting, and this polarizing hologram element 37 is integrated in one unit together with the light source unit 41 in which the light source 31 and the light-receiving element 38 are accommodated. Accordingly, the optical pickup device 30 can be made thin and compact. This is especially suitable for an optical pickup device used in an optical disk drive 50 of a notebook computer 80, as illustrated in FIG. 24.

Figure 25:
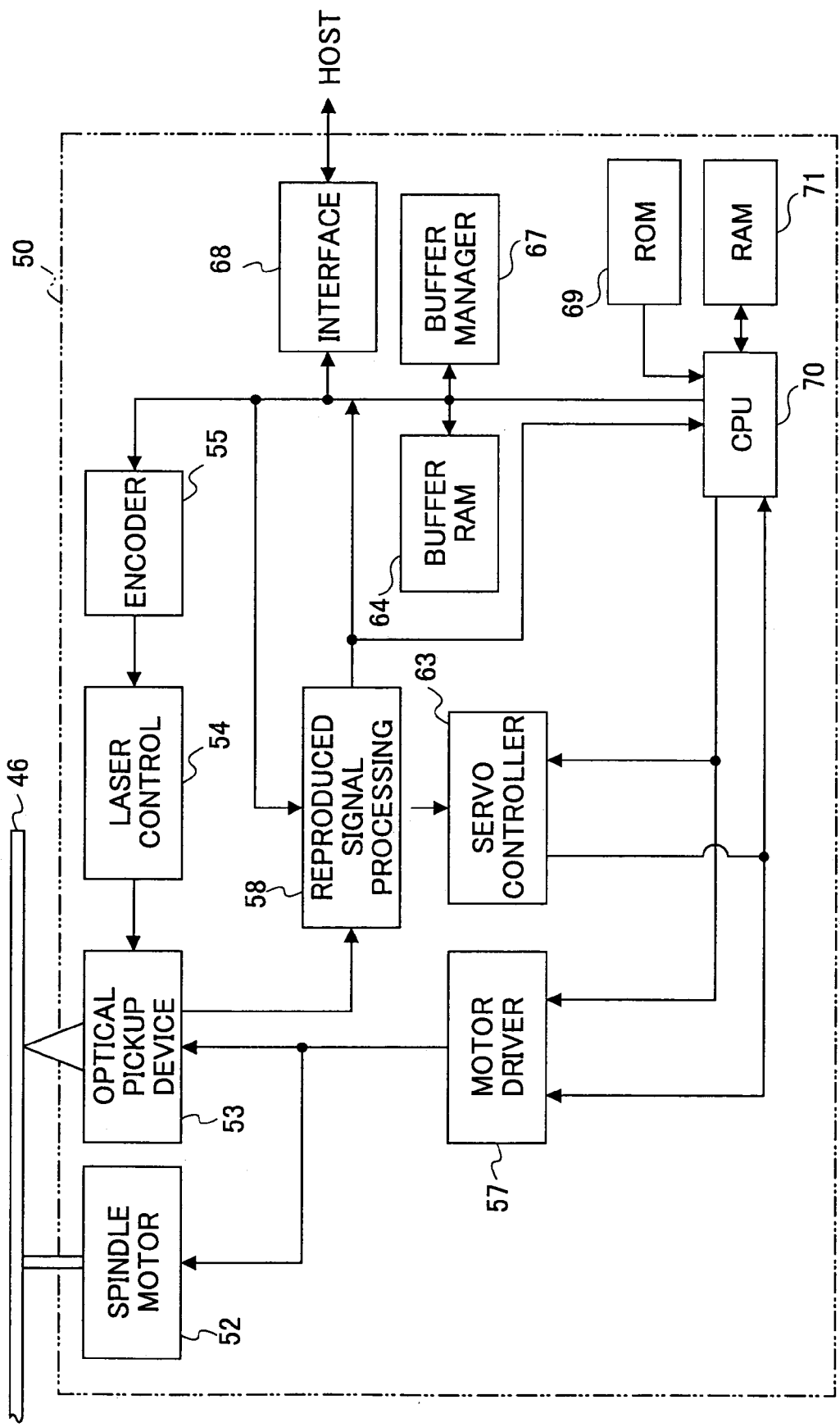
FIG. 25 is a block diagram showing the structure of the optical disk drive.

FIG. 25 is a block diagram of the optical disk drive 50. The optical disk drive 50 includes a spindle motor 52 for rotating the optical disc (information recording medium) 46, an optical pickup device 53, a laser control circuit 54, an encoder 55, a motor driver 57, a reproduced signal processing circuit 58, a servo controller 63, a buffer RAM 64, a buffer manager 67, an interface 68, a read only memory (ROM) 69, a central processing unit (CPU) 70, and random access memory (RAM) 71. The arrows depicted in the diagram indicate only typical data flows, without showing all the actual connections. Examples of the optical disc 46 include CD-type optical discs (CD, CD-R, CD-RW), and DVD-type optical discs (DVD, DVD-R, DVD-RW). By providing multiple light sources with different wavelengths in the optical pickup device 53, the optical disk drive 50 becomes CD-DVD compatible.

The optical pickup device 53 irradiates a laser beam onto the recording surface in which a spiral or concentric track is formed and receives the light beam reflected from the recording surface to record and reproduce the information. The optical pickup device 53 has a structure shown in FIG. 16, for example.

The reproduced signal processing circuit 58 converts the electric signal output from the optical pickup device 53 into a voltage signal, and detects a wobble signal, an RF signal containing the reproduced information, and servo signals (focusing error signal and tracking error signal) from the voltage signal. The reproduced signal processing circuit 58 extracts address information, synchronizing signal and other necessary information from the wobble signal. The extracted address information is supplied to the CPU 70, and the synchronizing signal is supplied to the encoder 55. The reproduced signal processing circuit 58 also carries out error correction on the RF signal, and stores the error-corrected RF signal in the buffer RAM 64 via the buffer manager 67. The servo signal is output to the servo controller 63 from the reproduced signal processing circuit 58. The servo controller 33 generates a control signal for controlling the optical pickup device 53, based on the servo signal, and outputs the control signal to the motor drive 57.

The buffer manager 67 manages data input and output to and from the buffer RAM 64. When the amount of data stored in the buffer RAM 64 reaches a predetermined level, this information is reported to the CPU 70 by the buffer manager 67. The motor driver 57 controls the optical pickup device 53 and the spindle motor 52 based on the control signals from the servo controller 63 and instructions from the CPU 70. The encoder 55 takes the data from the buffer RAM 64 via the buffer manager 67, and adds error correction codes to produce writing data that are to be written in the optical disc 46. The writing data are output to the laser control circuit 54 in synchronization with the synchronizing signal supplied from the reproduced signal processing circuit 58. The laser control circuit 54 controls the laser output of the optical pickup device 53.

The interface 68 is a bi-directional communication interface with a host (e.g., a personal computer) based on the ATAPI (AT Attachment Packet Interface) standard, the SCSI (Small Computer System Interface) standard, or other suitable standards.

The ROM 69 stores a control program described in Codes interpretable by the CPU 70. The CPU 70 controls the operations of the above-described respective components according to the program, and causes the data required for the control to be temporarily stored in the RAM 71.

In the above-exemplified optical disk drive 50, the optical pickup device 53 employs a diffraction optical element (or polarizing hologram element) described in one of Examples 1 through 5, and therefore, highly reliable signal detection is realized with improved light utilization efficiency. Consequently, the recording and reproducing speed is increased.

As has been described above, in the second embodiment, the diffraction efficiency can be set uniform over the grating by adjusting the duty (or the D/Λ ratio) even if the grating pitch varies.

Depending on the birefringence of the material forming the grating, the duty of the grating part with a smaller pitch is set smaller than that of the grating part with a greater pitch to make the diffraction efficiency uniform over the entire grating, while keeping the diffraction efficiency high.

Alternatively, depending on the birefringence of the material forming the grating, the duty of the grating part with a smaller pitch is set greater than that of the grating part with a greater pitch to make the diffraction efficiency uniform over the entire grating, while keeping the diffraction efficiency high.

The duty of a grating with a variable pitch is adjusted so that the diffraction efficiency becomes uniform over the grating.

The diffraction optical element may be divided into multiple grating regions, each region having a different pitch. In this case, each of the grating regions has a different duty in accordance with the associated pitch so that the diffraction efficiencies of the grating regions become uniform.

The duty of the grating region with a smaller pitch is set smaller or greater than that of the other grating region with a greater pitch, depending on the birefringence of the material used for the grating.

A duty is set for each of the grating regions so that the diffraction efficiencies of the grating regions become uniform over the diffraction optical element, while keeping the entire grating diffraction efficiency high. This arrangement can simplify the process of manufacturing the mask, including the mask design.

The grating is formed in an optically anisotropic and birefringent material, and the grooves of the grating are filled with an isotropic material. Since the grating is formed directly in the optically anisotropic and birefringent material, a fine-pitch grating can be fabricated. In addition, the isotropic material functions as both filler and adhesive, and the fabrication process can be simplified.

The optically anisotropic and birefringent material is, for example, a drawn film of organic polymer, which is inexpensive and suitable for large-area processing. Accordingly, the cost can be reduced. The index of refraction of the drawn film of organic polymer is at or near 1.6 (for a wavelength of 660 nm), which is relatively low, and therefore, the index of refraction of the isotropic material used in filling the grooves can be adjusted over a wide range. The transparency of the isotropic material is selected so as not to reduce the light utilization efficiency.

The grating may be formed in an optically isotropic material, and the grooves of the grating may be filled with an optically anisotropic and birefringent material. For example, the grating is formed directly in glass that is easy to process. Accordingly, a fine-pitch grating can be fabricated in a stable manner, and high reliability is achieved.

In this case, the grooves may be filled with liquid crystal, which can reduce manufacturing cost. Since the birefringence of liquid crystal is high, the grooves may be shallow. The processing time can be reduced, and the productivity is improved.

The above-described diffraction optical element is fabricated using a mask having a grating pattern with the duty variably adjusted in accordance with the pitch. An optically anisotropic and birefringent material is etched using the mask so as to form periodically arranged grooves, and the grooves are filled with an optically isotropic material.

Alternatively, an optically isotropic material is etched using the mask so as to form periodically arranged grooved, and the grooves are filled with an optically anisotropic and birefringent material Appropriate duties are set in accordance with different pitches when preparing the mask. For the rest of the portion, the existing fabrication process can be utilized as it is, and therefore, the diffraction optical element with high and uniform diffraction efficiency can be fabricated at low cost.

By using the above-described diffraction optical element that has little variation in diffraction efficiency over the grating in an optical pickup device, high-speed recording can be achieved based on well-balanced signal output and accurate tracking signal detection. Since the diffraction efficiency of the grating can be made uniform regardless of the pitches, the degree of freedom for designing the optical pickup device is increased.

By installing the optical pickup device in an optical disk drive, highly reliable detection signals are obtained at high light utilization efficiency, and high-speed recording and reproduction can be realized.

This patent application is based on and claims the benefit of the earlier filing dates of Japanese Patent Application Nos. 2002-295642 filed Oct. 9, 2002, and 2002-380750 filed Dec. 27, 2002, the entire contents of which are hereby incorporated by reference.

The invention claimed is:

1. A diffraction optical element divided into a plurality of grating regions, each of the grating regions having a grating with a pitch that is different from pitches of the other grating regions, and each of the grating regions having a different duty, where the duty denotes the ratio of the width of a protrusion of the grating region to the pitch of the grating region, wherein at least one of said plurality of grating regions has a variable pitch and a variable groove width.

2. The diffraction optical element according to claim 1, wherein the grating of each of the grating regions is formed using a birefringent material, and the duty of the grating region with the smallest pitch is set less than the duties of the other grating regions, depending on the birefringence of the birefringent material.

3. The diffraction optical element according to claim 1, wherein the grating of each of the grating regions is formed using a birefringent material, and the duty of the grating region with the smallest pitch is set greater than the duties of the other grating regions, depending on the birefringence of the birefringent material.

4. The diffraction optical element according to claim 1, wherein the duty of each of the grating regions is determined so that the diffraction efficiencies of the grating regions become substantially equal to each other.

5. The diffraction optical element according to claim 1, wherein the grating of each of the grating regions is formed in an optically anisotropic and birefringent material, and grooves of the grating are filled with an isotropic material.

6. The diffraction optical element according to claim 5, wherein the optically anisotropic and birefringent material is a drawn film of organic polymer.

7. The diffraction optical element according to claim 1, wherein the grating of each of the grating regions is formed in an optically isotropic material, and grooves of the grating are filled with an optically anisotropic and birefringent material.

8. The diffraction optical element according to claim 7, wherein the optically anisotropic and birefringent material is liquid crystal.

9. An optical pickup device comprising:
a light source for emitting a light beam; a condensing lens for guiding the light beam onto an optical recording medium;
a diffraction optical element positioned on an optical path extending between the light source and the optical recording medium; and
a photodetector for receiving a portion of the light beam reflected from the optical recording medium and diffracted from the diffraction grating, the diffraction optical element being divided into a plurality of grating regions, each grating region having a grating with a different pitch, and a duty of the grating of each of the grating regions being set in accordance with the associated pitch, where the duty denotes a ratio of the width of a of the grating region to the pitch of the grating region, wherein at least one of said plurality of grating regions has a variable pitch and a variable groove width.

10. An optical disk drive comprising an optical pickup described in claim 9, for recording and reproducing information in and from, respectively, a recording medium.

* * * * *